(12) United States Patent
Sakurai et al.

(10) Patent No.: US 7,538,911 B2
(45) Date of Patent: May 26, 2009

(54) LIGHTING DEVICE IMAGE, READING APPARATUS, AND IMAGE FORMING APPARATUS

(75) Inventors: Yasuo Sakurai, Kanagawa (JP); Masashi Kohchi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1012 days.

(21) Appl. No.: 10/921,283

(22) Filed: Aug. 19, 2004

(65) Prior Publication Data

US 2005/0088707 A1    Apr. 28, 2005

(30) Foreign Application Priority Data

Aug. 19, 2003  (JP)  ............... 2003-295160
Nov. 20, 2003  (JP)  ............... 2003-390764
Jan. 14, 2004  (JP)  ............... 2004-006448

(51) Int. Cl.
  *H04N 1/04*  (2006.01)
  *G02B 6/32*  (2006.01)
  *F21V 7/04*  (2006.01)

(52) U.S. Cl. ............... 358/475; 358/474; 358/484; 385/34; 385/36; 362/611; 362/624

(58) Field of Classification Search ............... 358/475, 358/474, 480, 484, 509, 510; 385/33, 32, 385/34, 35, 36; 399/211, 118; 362/601, 362/610, 611, 615, 620, 624, 626, 621, 622, 362/558

See application file for complete search history.

(56) References Cited

U.S. PATENT DOCUMENTS

| | | | |
|---|---|---|---|
| 4,638,987 A | 1/1987 | Sakurai | |
| 4,715,597 A | 12/1987 | Sakurai | |
| 4,974,927 A * | 12/1990 | Kimura | ............... 385/33 |
| 5,715,500 A | 2/1998 | Nakazato et al. | |
| 5,810,463 A * | 9/1998 | Kawahara et al. | ............ 362/601 |
| 6,034,792 A | 3/2000 | Nakazato et al. | |
| 6,480,303 B1 | 11/2002 | Kawasaki et al. | |
| 6,563,609 B1 * | 5/2003 | Hattori | ............... 358/475 |
| 6,731,896 B2 | 5/2004 | Kohchi | |
| 2005/0088707 A1 | 4/2005 | Sakurai et al. | |

(Continued)

FOREIGN PATENT DOCUMENTS

EP    275116    *    7/1988

(Continued)

OTHER PUBLICATIONS

U.S. Appl. No. 11/452,217, filed Jun. 14, 2006, Sakurai.

(Continued)

*Primary Examiner*—Jerome Grant, II
(74) *Attorney, Agent, or Firm*—Oblon, Spivak, McClelland, Maier & Neustadt, P.C.

(57) ABSTRACT

A lighting device used in an image forming apparatus includes point light sources that emits rays; and a condensing body that is arranged in a direction of the rays emitted from the point light source and that condenses the rays on a surface of a document, which is placed on a contact glass, within a reading width in a sub-scanning direction of the document. The condensing body is arranged in a direction in which angles of all rays, which pass through the condensing body, are smaller than a critical angle of total reflection on the contact glass.

14 Claims, 17 Drawing Sheets

U.S. PATENT DOCUMENTS

2005/0135840 A1 * 6/2005 Sakurai et al. .............. 399/211

FOREIGN PATENT DOCUMENTS

| | | |
|---|---|---|
| EP | 0 410 395 | 1/1991 |
| EP | 1 017 222 | 7/2000 |
| EP | 1 104 163 | 5/2001 |
| JP | 61-163313 | 7/1986 |
| JP | 63314963 * | 12/1988 |
| JP | 3-7881 | 1/1991 |
| JP | 3-7887 | 1/1991 |
| JP | 3-165661 | 7/1991 |
| JP | 8-116401 | 5/1996 |
| JP | 10-126576 | 5/1998 |
| JP | 10-322521 | 12/1998 |
| JP | 10-336392 | 12/1998 |
| JP | 11-215304 | 8/1999 |
| JP | 2001-222076 | 8/2001 |

OTHER PUBLICATIONS

Patent Abstracts of Japan, JP 2001-222076, Aug. 17, 2001.

* cited by examiner

LIGHTING DEVICE IMAGE, READING APPARATUS, AND IMAGE FORMING APPARATUS

CROSS-REFERENCE TO RELATED APPLICATIONS

The present document incorporates by reference the entire contents of Japanese priority documents, 2003-295160 filed in Japan on Aug. 19, 2003, 2003-390764 filed in Japan on Nov. 20, 2003, and 2004-006448 filed in Japan on Jan. 14, 2004.

BACKGROUND OF THE INVENTION

1) Field of the Invention

The present invention relates to a lighting device, an image reading apparatus, and an image forming apparatus.

2) Description of the Related Art

An image reading apparatus, such as a scanner, has a light source. This light source is located above a contact glass and emits rays toward a surface of a document to be scanned. The light reflected from the surface of the document is focuses on a photoelectric conversion element (CCD) via a lens.

As a light source for such an image reading apparatus, a bar light source like a fluorescent tube or a xenon lamp or a point light source such as an LED is used.

When the bar light source is used, flare light tends to be generated because a width of emission of rays from the bar light source is wider in a sub-scanning direction when reading the document. Rays reflected on a surface of a document in directions other than a direction along a reading optical axis is reflected on the bar light source and members around the bar light source. The flare light is the reflected light traveling toward the surface of the document again. Such flare light is generated more often when the surface of the document is more whitish. Therefore, an amount of generation of flare light is different when the surface of the document is whitish and blackish, and decline in reading performance due to an influence of the flare light is caused.

On the other hand, when the point light source, such as an LED, is used, for example, those disclosed in Japanese Patent Application Laid-Open Publication Nos. H08-116401, H10-126576, and H10-336392 are known. Since the point light source such as an LED has a smaller quantity of light compared with the bar light source, generation of the flare light is small, and the decline in reading performance due to the influence of the flare light is controlled.

When the point light source is used as a light source, plural point light sources are arranged linearly in a main scanning direction (reading line direction). Thus, when rays emitted from the respective point light sources are directly irradiated on a reading surface like a surface of a document, an illuminance ripple (unevenness of an illuminance distribution) occurs in the main scanning direction. As a result, when an image is formed according to read image data, unevenness in image concentration due to the illuminance ripple occurs.

Therefore, various techniques for controlling the occurrence of an illuminance ripple in the image reading apparatus using the point light source have been proposed. For example, according to Japanese Patent Application Laid-Open Publication No. H10-322521, illuminance equalizing means including a diffraction grating is provided between plural point light sources and a surface of a document that is an object of reading.

However, since the point light sources have a small quantity of light, insufficiency of a quantity of light tends to occur unless a direction of irradiation of light is considered sufficiently.

In addition, since the point light sources have a small quantity of light, the point light sources tend to be arranged close to a surface of a document. Therefore, when the surface of the document lifts from a contact glass, a rate of decline in a quantity of light irradiated on the surface of the document is large even if a dimension of the lift is small, and reading performance tends to fall.

When a cut and pasted document is read, if the document is lighted only from one direction of a reading optical axis, a shadow occurs in a cut and pasted step part.

Japanese Patent Application Laid-Open No. H10-322521 discloses a structure for diffracting rays emitted from the point light sources with the diffraction grating. Thus, although a difference between a maximum illuminance and a minimum illuminance of the illuminance ripple is reduced, the image reading apparatus comes into a state in which the number of ripples has increased, and the illuminance ripple still remains.

SUMMARY OF THE INVENTION

It is an object of the present invention to solve at least the problems in the conventional technology.

A lighting device according to an aspect of the present invention includes a point light source that emits rays; and a condensing body that is arranged in a direction of the rays emitted from the point light source and that condenses the rays on a surface of a document, which is placed on a contact glass, within a reading width in a sub-scanning direction of the document. The condensing body is arranged in a direction in which angles of all rays, which pass through the condensing body, are smaller than a critical angle of total reflection on the contact glass.

A lighting device according to another aspect of the present invention includes a point light source that emits rays; and a condensing body that is arranged in a direction of the rays emitted from the point light source and that condenses the rays on a surface of a document, which is placed on a contact glass, within a reading width in a sub-scanning direction of the document. The condensing body is arranged in an area close to a reading light reflection area in which the rays reflected on the surface of the document travel along a reading optical axis.

A lighting device according to still another aspect of the present invention includes a point light source that emits rays; and a condensing body that is arranged in a direction of the rays emitted from the point light source and that condenses the rays on a surface of a document, which is placed on a contact glass, within a reading width in a sub-scanning direction of the document. The condensing body is arranged in a position where a position of a peak value of a quantity of light of rays which pass through the condensing body is near a reading optical axis.

A lighting device according to still another aspect of the present invention includes a point light source that emits rays; a condensing body that is arranged in a direction of the rays emitted from the point light source and that condenses the rays on a surface of a document, which is placed on a contact glass, within a reading width in a sub-scanning direction of the document; and a reflection mechanism that reflects a part of the rays, which pass through the condensing body, toward the surface of the document from an opposite side with respect to a reading optical axis.

An image reading apparatus according to still another aspect of the present invention includes the above lighting device; and a photoelectric conversion element that reads rays reflected on a surface of the document after being emitted from the lighting device.

An image forming apparatus according to still another aspect of the present invention includes the above image reading apparatus; and an image forming unit that forms an image on a recording medium according to image data read by the image reading apparatus.

A lighting device according to still another aspect of the present invention includes a plurality of point light sources arranged linearly; a condensing body that is arranged in a direction of rays emitted from the point light sources and that condenses the rays in a direction perpendicular to an arrangement direction of the point light sources; and a light diffusing portion that is arranged on an optical path through which rays emitted from the point light sources reach an object to be light and diffuses the rays at random.

An image reading apparatus according to still another aspect of the present invention includes the above a lighting device that lights a surface of a document that is the object; and an image reading unit that reads reflected light from the surface of the document.

An image forming apparatus according to still another aspect of the present invention includes the above image reading apparatus; and an image forming unit that forms an image on a recording medium according to image data read by the image reading apparatus.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be hereinafter explained with reference to the accompanying drawings.

Figure 1:
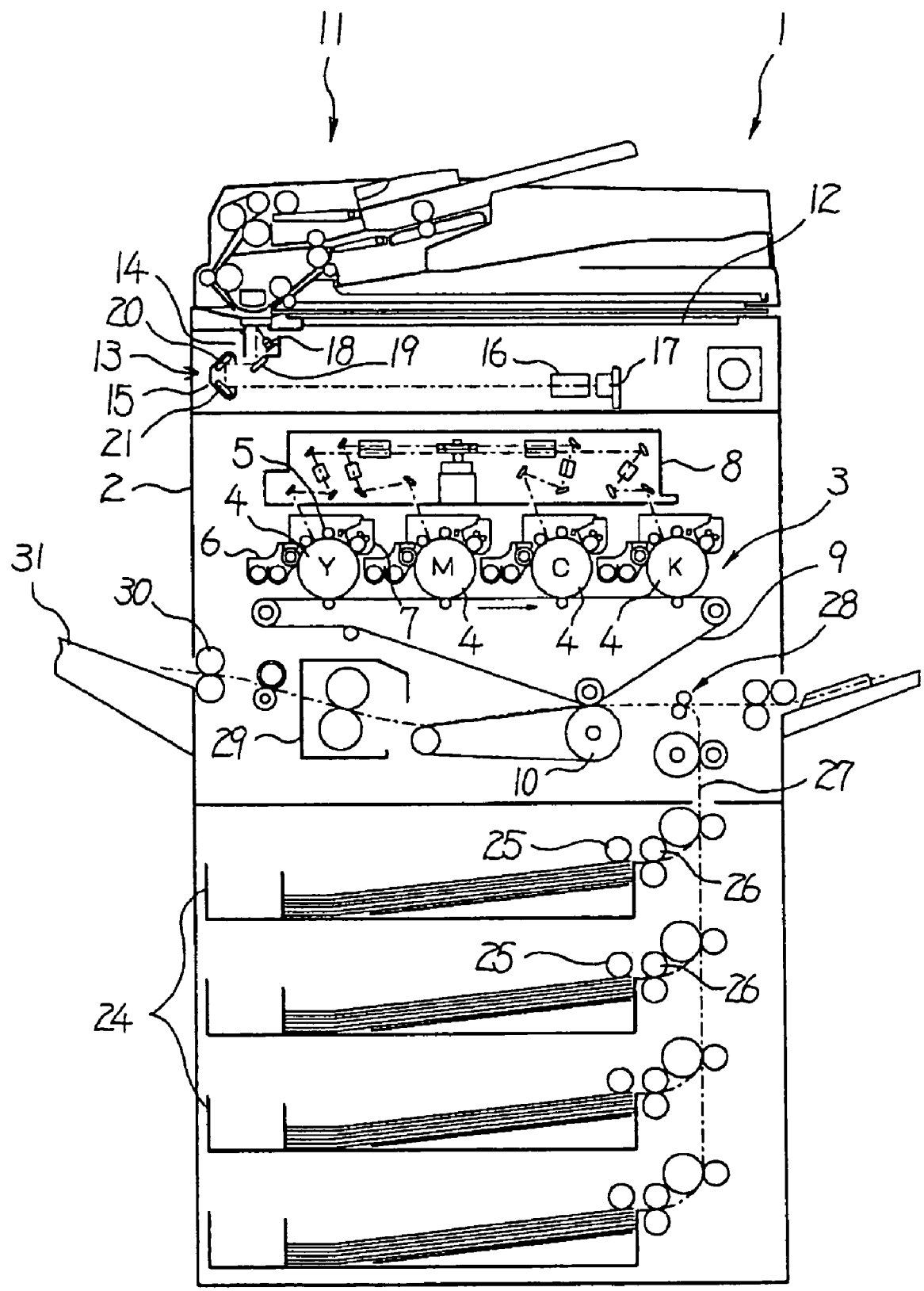
FIG. 1 is a front view of a copying machine according to a first embodiment of the present invention.

A first embodiment of the present invention will be explained with reference to FIGS. 1 to 4. FIG. 1 is a schematic front view of an internal structure of a full-color copying machine 1 that is an image forming apparatus to which the present invention is applied.

An image forming unit 3 for forming a color image is provided in a central part in an apparatus body 2 of the copying machine 1. This image forming unit 3 includes: four drum-like photosensitive members 4 that are arranged in parallel horizontally to be spaced apart at an equal interval; charging rollers 5 that are arranged in outer peripheries of the respective photosensitive members 4 and form toner images on outer peripheral surfaces of the photosensitive members 4 with an electrophotographic process; developing devices 6; cleaning devices 7; an exposing device 8 that exposes the uniformly charged outer peripheral surfaces of the photosensitive members 4 to a laser beam according to image data to thereby form electrostatic latent images on the outer peripheral surfaces; an intermediate transfer belt 9 on which toner images formed on the outer peripheral surfaces of the respective photosensitive members 4 are sequentially transferred, whereby a color toner image is formed; and a transfer roller 10 that transfers the color toner image on the intermediate transfer belt 9 onto a recording medium S. Note that toner images of Y (yellow), M (magenta), C (cyan), and B (black) are formed in the four photosensitive members 4, respectively.

An ADF (automatic document feeder) 11, which automatically feeds a document that is the object to be read (that is, scanned), and an image reading apparatus 13, which reads the document automatically fed by the ADF 11 or a document placed on a contact glass 12, are arranged above the apparatus body 12. The image reading apparatus 13 includes: first and second traveling bodies 14 and 15 that are capable of traveling at speeds in the ratio of 2:1 in parallel with the contact glass 12; a lens 16; and a CCD 17 serving as a photoelectric conversion element. The first traveling body 14 is mounted with a lighting device 18 for lighting a surface of the document placed on the contact glass 12 or the document conveyed by the ADF 11 and a first mirror 19 that reflects light reflected on the surface of the document and traveling along a reading optical axis. The second traveling body 15 is mounted with a second mirror 20 and a third mirror 21 that further reflect the light reflected by the first mirror 19. A lens 16 and a CCD 17 are arranged in a traveling direction of the reading light sequentially reflected by the first to the third mirrors 19, 20, and 21.

Sheet cassettes 24 of plural stages, for example, four stages, in which recording media S are stored, are provided below the apparatus body 2. The recording media S stored in these sheet cassettes 24 are separated and fed one by one by pickup rollers 25 and feed rollers 26. The separated and fed sheets are conveyed along a sheet conveying path 27 provided in the apparatus body 2. A registration roller 28, the transfer roller 10, a fixing device 29, a discharge roller 30, and the like are arranged along this sheet conveying path 27.

In such a structure, laser beams corresponding to image data of respective colors (yellow Y, magenta M, cyan C, and black B) are emitted from semiconductor lasers of the exposing device 8 according to a result of reading by the image reading apparatus 13. The laser beams exposes the outer peripheral surfaces of the respective photosensitive members 4 that are uniformly charged by the charging rollers 5, whereby electrostatic latent images are formed. Toners of the respective colors are supplied to the electrostatic latent images from the respective developing devices 6, whereby toner images of the respective colors are formed. The toner images on the respective photosensitive members 4 are sequentially transferred onto the intermediate transfer belt 9, which moves in synchronization with the photosensitive members 4, and a color toner image is formed on the intermediate transfer belt 9.

On the other hand, the sheets are started to be separated and fed from the inside of the sheet cassettes 24 before or after the start of the image forming operation in the image forming unit 3. The sheets separated and fed and conveyed through the sheet conveying path 27 are timed by the registration roller 28 that is driven to rotate intermittently. The registration roller 28 is driven to rotate at timing when the color toner image on the intermediate transfer belt 9 is transferred onto a proper position of the recording media S.

When the recording media S, which are conveyed by the registration roller 28 being driven to rotate, pass between the intermediate transfer belt 9 and the transfer roller 10, the color toner image on the intermediate transfer belt 9 is transferred onto the recording media S. The color toner image transferred onto the recording media S is fixed on the recording media S in a course of passing through the fixing device 29, and the recording media having the color toner image fixed thereon are discharged onto a discharge tray 31 by the discharge roller 30.

Figure 2:
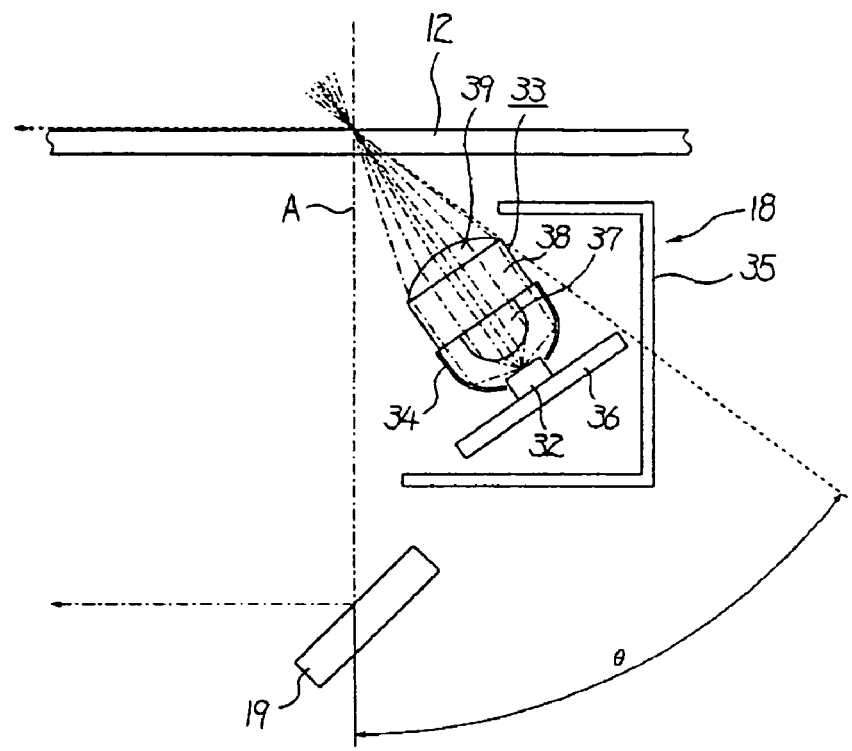
FIG. 2 is a front view of a lighting device.
Figure 3:
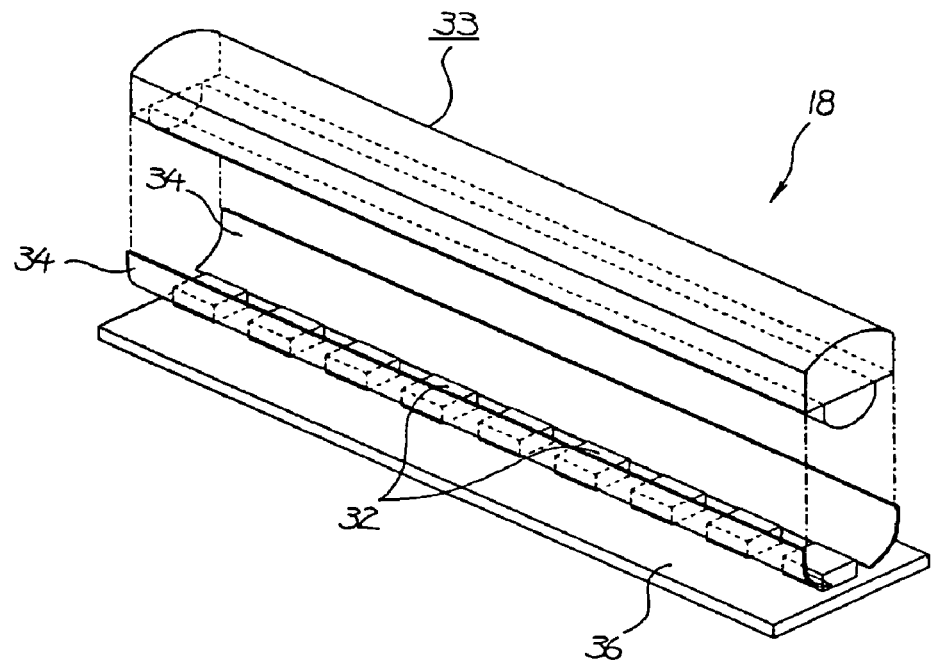
FIG. 3 is a disassembled perspective view of the lighting device.

FIG. 2 is a front view of the lighting device 18 and the first mirror 19 mounted on the first traveling body 14. FIG. 3 is a perspective view showing the lighting device 18 in a disassembled form. The lighting device 18 includes plural LEDs 32 serving as point light sources, a condensing body 33, and a light-shielding member 35.

The LEDs 32 are arranged at an equal interval on an elongated substrate 36. The substrate 36 is positioned in a direction in which the plural LEDs 32 are arranged along a main scanning direction at the time of image reading.

The condensing body 33 includes a lens 37, a light guide member 38, and a condensing lens 39, which are integrally molded, and is formed in an elongated shape having substantially the same length as the substrate 36. The condensing body 33 is positioned in such a manner that its length is aligned with the main scanning direction of reading the document.

A reflection plate 34 has substantially the same length as the substrate 36 and the condensing body 33 and is arranged in such a manner that it covers the LEDs 32 and a part of the condensing body 33 from both sides in a sub-scanning direction of reading the document.

Figure 4:
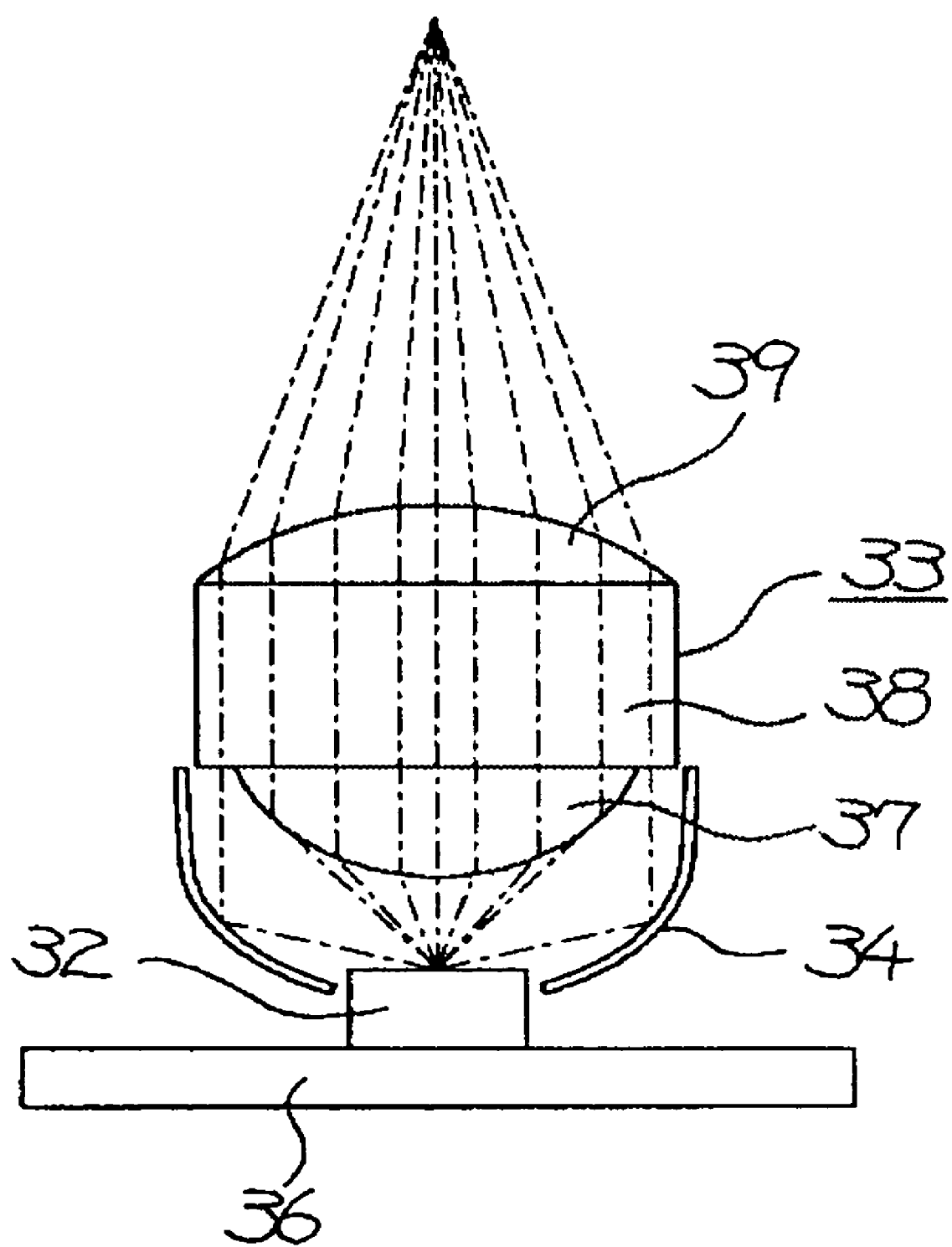
FIG. 4 is a front view explaining a state in which light emitted from an LED are condensed by a condensing body.

FIG. 4 is a front view explaining a state in which rays emitted from the LEDs 32 are emitted through the condensing body 33. The rays emitted from the LEDs 32 in a diffused state partly pass through the lens 37 to be thereby deflected into parallel rays and are partly reflected by the reflection plate 34 and deflected into parallel rays. The rays travel through the light guide member 38 in a form of parallel rays. The rays, which have passed through the light guide member 38, are condensed when the rays pass through the condensing lens 39.

In this way, the rays emitted from the LED 32 are condensed by passing through the condensing body 33, and the condensed rays are irradiated toward a surface of a document that is placed on the contact glass 12. The rays to be condensed by the condensing body 33 are condensed within a reading width in a sub-scanning direction of the surface of the document at the time of image reading, that is, within an appropriate width with respect to a reading line width in the sub-scanning direction. A reading optical axis A, which is a direction in which rays reflected on the surface of the document travel for image reading, is located in a central position of this reading width.

The condensing body 33 is arranged in a direction in which angles of all rays irradiated toward the surface of the document through this condensing body 33 are smaller than a critical angle "θ" of total reflection on the contact glass 12. This critical angle "θ" is an angle from the reading optical axis A. When an angle of a ray traveling toward the contact glass 12 reaches the critical angle "θ", as indicated by a broken line in FIG. 4, the ray does not pass through the contact glass 12 but is totally reflected to be a ray not used for lighting of the surface of the document.

In such a structure, angles of all rays, which have been emitted from the LED 32 and have passed through the condensing body 33, are maintained to be smaller than the critical angle "θ" of the contact glass 12. Thus, the rays are transmitted through the contact glass 12 without being reflected by the contact glass 12 and are irradiated on the surface of the document. Consequently, all the rays emitted from the LEDs 32 can be utilized effectively to light the surface of the document. Therefore, even in the case in which the LEDs 32, which are point light sources with a small quantity of light, are used as light sources for the lighting device 18, a quantity of light necessary for image reading can be secured.

Figure 5A:
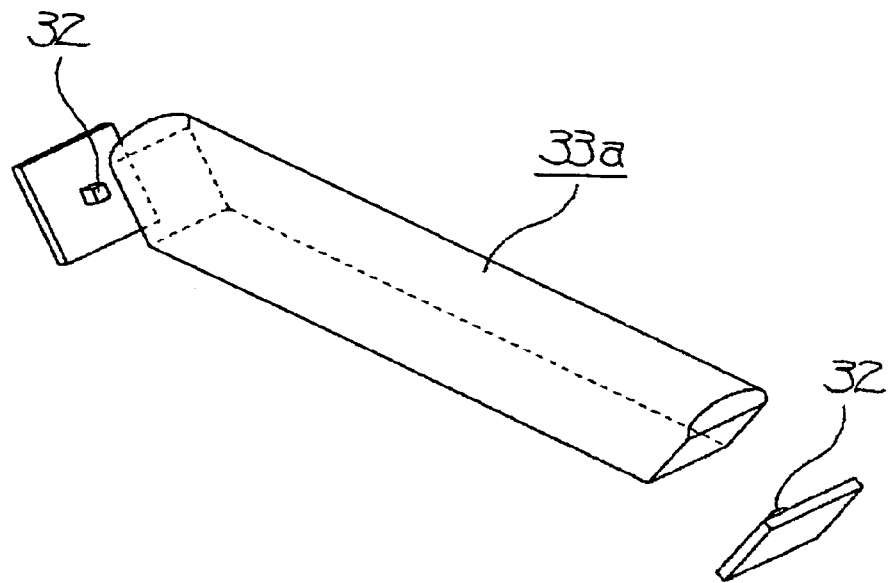
FIG. 5A is a perspective view of a lighting device according to a second embodiment of the present invention.
Figure 5B:
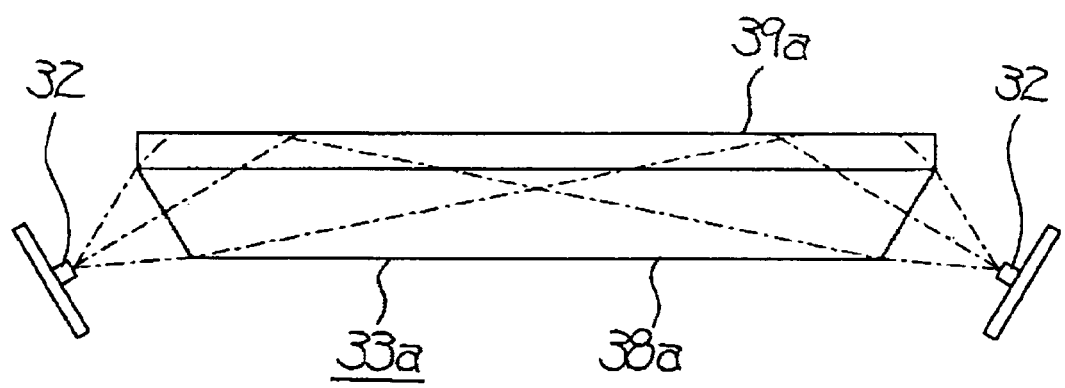
FIG. 5B is a side view of the lighting device according to the second embodiment.
Figure 6:
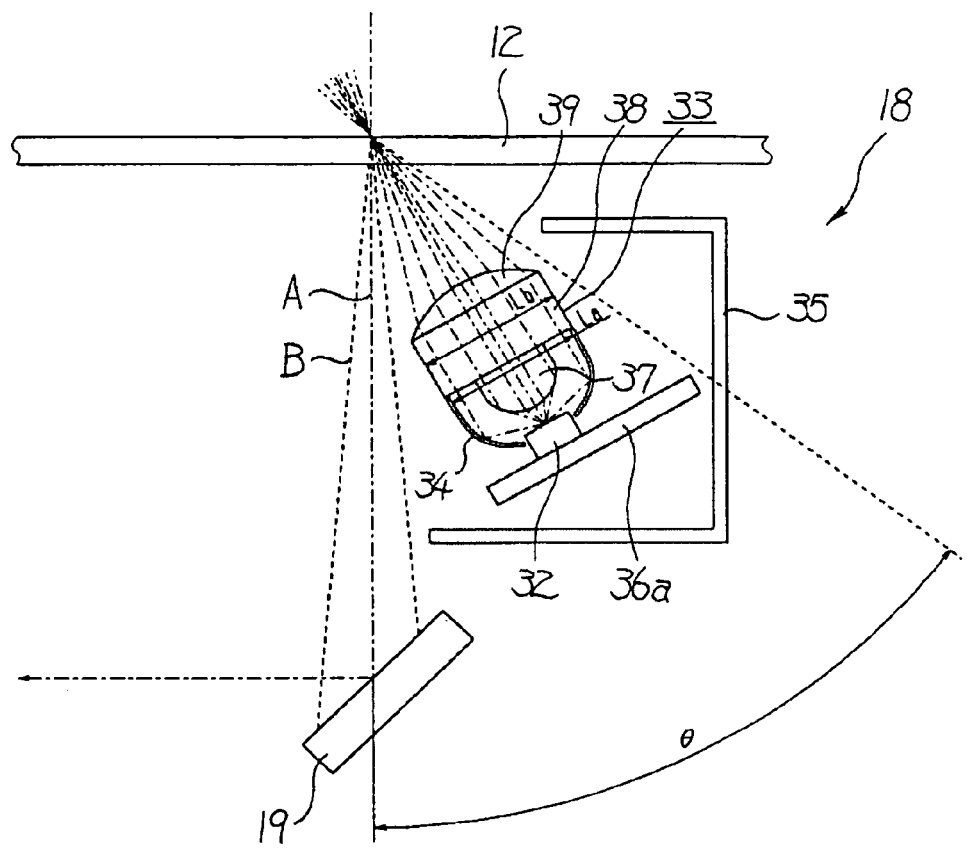
FIG. 6 is a front view of a lighting device according to a third embodiment of the present invention.
Figure 7:
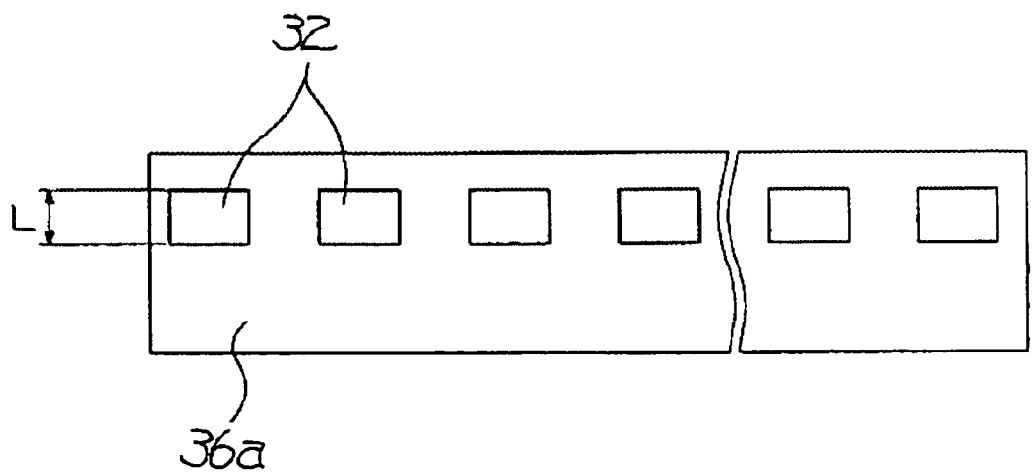
FIG. 7 is a plan view of a part of the lighting device.

A second embodiment of the present invention will be explained with reference to FIGS. 5A and 5B. Note that the same components as those explained in FIGS. 1 to 4 are denoted by the same reference numerals and signs and will not be explained repeatedly (this holds true for embodiments to be explained below). In the second embodiment, one LED 32 serving as a point light source is provided at each of both ends of an elongated condensing body 33a. The LEDs 32 may be provided only at one end of the condensing body 33a.

The condensing body 33a includes a light guide member 38a, which causes rays emitted from the LEDs 32 to travel straightly, and a condensing lens 39a, which condenses rays having passed through the light guide member 38a within a reading width in a sub-scanning direction of a surface of a document at the time of image reading (within an appropriate width with respect to a reading line width in the sub-scanning direction).

In the second embodiment, the condensing body 33a is also arranged in a direction in which angles of all rays, which have passed through this condensing body 33a to be irradiated toward the surface of the document, are smaller than the critical angle "θ" of total reflection on the contact glass 12.

Therefore, when the surface of the document is lighted using this condensing body 33a, rays condensed by the condensing body 33a are transmitted through and irradiated on the surface of the document without being reflected on the contact glass 12. Thus, all rays emitted from the LEDs 32 can be utilized effectively to light the surface of the document.

A third embodiment of the present invention will be explained with reference to FIGS. 6, 7, 8A, and 8B. In the third embodiment, as in the first embodiment, the lighting device 18, which includes the plural LEDs 32 serving as point light sources, the condensing body 33, the reflection plate 34, and the light-shielding member 35, is provided. As in the first embodiment, the condensing body 33 includes the lens 37, the light guide member 38, and the condensing lens 39 that are integrally molded.

The condensing body 33 is arranged within a range in which angles of all rays, which have passed through this condensing body 33 to be irradiated toward the surface of the document, are smaller than the critical angle "θ" of total reflection on the contact glass 12 and in an area close to a reading light reflection area B in which rays reflected on the surface of the document travel along the reading optical axis A.

In the third embodiment, various contrivances for providing the condensing body 33 close to the reading light reflection area B are made. As one of them, the LEDs 32 are arranged on one end side in a direction perpendicular to a direction of arrangement of the LEDs 32 on a substrate 36a, and the substrate 36a is arranged toward a side where the end side, on which the LEDs 32 are arranged, is the reading light reflection area B. Consequently, the condensing body 33 can be provided closer to the reading light reflection area B.

As another one of the contrivances for providing the condensing body 33 close to the reading light reflection area B, the LEDs 32 are formed in an elongated shape toward a direction along the main scanning direction at the time of image reading. In other words, the LEDs 32 are designed to have a shape in which a width dimension L in the sub-scanning direction when reading the document is reduced. This makes it possible to provide a central position of the LEDs 32 attached to the substrate 36a closer to the width direction of the substrate 36a, and the condensing body 33 can be provided closer to the reading light reflection area B.

As another contrivances for providing the condensing body 33 close to the reading light reflection area B, a width dimension La between inner surfaces, which becomes the sub-scanning direction, of the reflection plate 34 arranged between the LEDs 32 and the condensing body 33 is set to be smaller than a width direction Lb of the condensing body 3 (La≦Lb). Therefore, even when the reflection plate 34 is provided, it is unnecessary to provide the condensing body 33 away from the reading light reflection area B as a result of providing the reflection plate 34, and the condensing body 33 can be provided close to the reading light reflection area B.

Figure 8A:
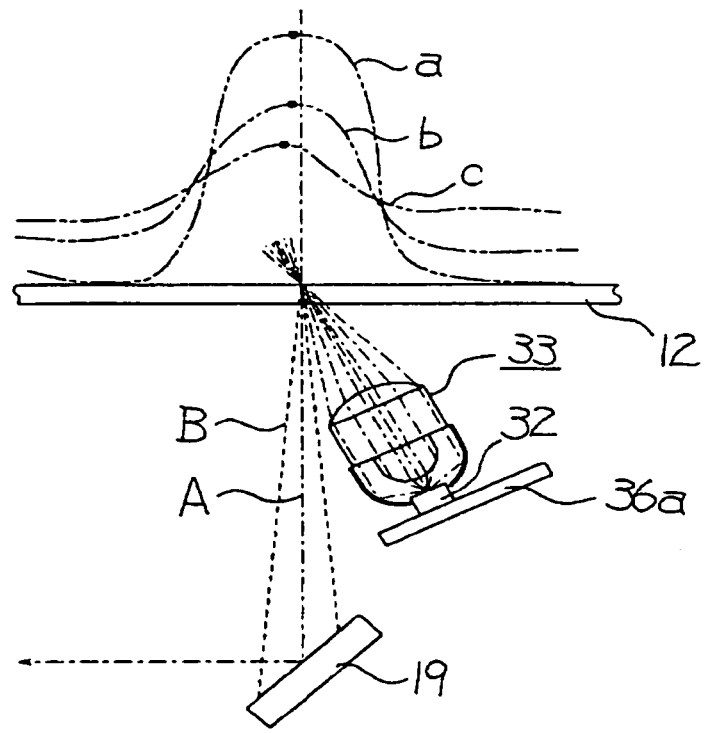
FIGS. 8A and 8B are front views showing a relation in which a position of a peak value of a quantity of light on a surface of a document changes when a condensing body approaches and separates from a reading light reflection area.
Figure 8B:
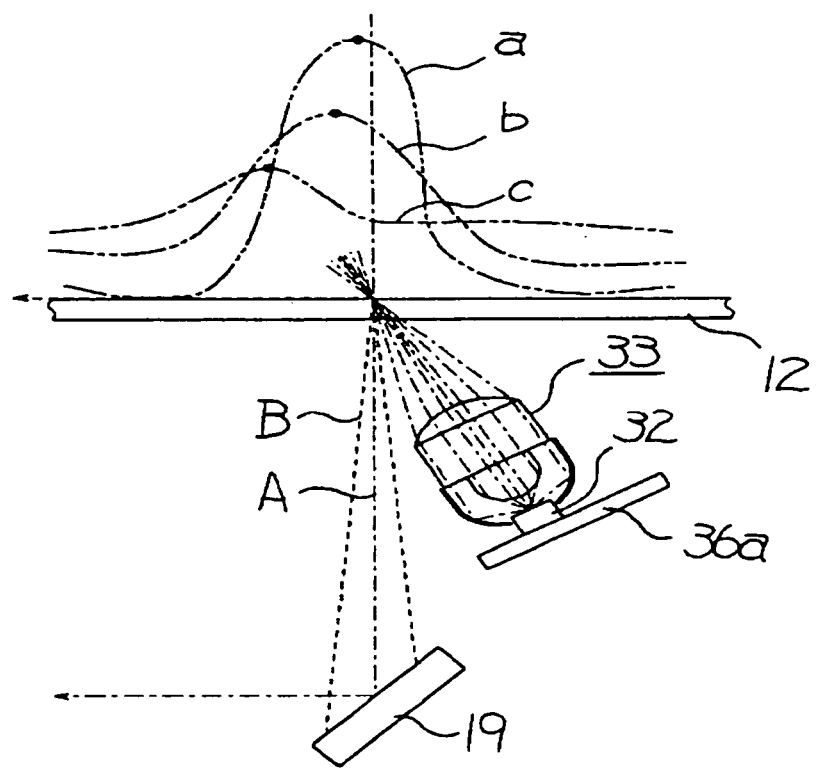

Here, a difference between the case in which the condensing body 33 is provided close to the reading light reflection area B and the case in which the condensing body 33 is provided away from the reading light reflection area B will be explained with reference to FIGS. 8A and 8B. FIG. 8A shows the case in which the condensing body 33 is provided close to the reading light reflection area B, and FIG. 8B shows the case in which the condensing body 33 is provided away from the reading light reflection area B compared with the case shown in FIG. 8A. In FIG. 8, "a", "b", and "c" indicate quantities of light irradiated on a surface of a document on the contact glass 12. Precisely, "a" indicates a quantity of light when the surface of the document sticks firmly to the contact glass 12, "b" indicates a quantity of light when the surface of the document lifts slightly from the contact glass 12, and "c" indicates a quantity of light when the surface of the document lifts further from the contact glass 12. Moreover, black circles (or dots) indicate positions of peak values of a quantity of light at the time when the surface of the document is located in "a", "b", and "c", respectively.

As shown in FIG. 8A, when the condensing body 33 is provided close to the reading light reflection area B, the position of a peak value of a quantity of light of rays irradiated on the surface of the document sticking firmly to the contact glass 12 is close to the reading optical axis A. Even when the surface of the document lifts from the contact glass 12, the position of a peak value of a quantity of light of rays irradiated on the surface of the document is maintained to be close to the reading optical axis A, a rate of decline in a quantity of light of rays irradiated on the surface of the document above the reading optical axis A decreases, and lighting performance with respect to the surface of the document above the reading optical axis A is maintained.

On the other hand, as shown in FIG. 8B, when the condensing body 33 is provided relatively away from the reading light reflection area B, the position of a peak value of a quantity of light of rays irradiated on the surface of the document sticking firmly to the contact glass 12 is away from the reading optical axis A. When the surface of the document lifts from the contact glass 12, the position of a peak value of a quantity of light of rays irradiated on the surface of the document further moves away from the reading optical axis A, a rate of decline in a quantity of light of rays irradiated on the surface of the document above the reading optical axis A increases, and lighting performance with respect to the surface of the document above the reading optical axis A declines.

Consequently, when a ray emitted from the LED 32 and condensed by the condensing body 33 is irradiated on the surface of the document, as the condensing body 33 is closer to the reading light reflection area B, even if the document on the contact glass 12 gets lifted, a quantity of light rays irradiated on the surface of the document above the reading optical axis A can be secured more, lighting performance of the lighting apparatus 18 is maintained better, and reading performance of the image reading apparatus 13 is maintained better.

In the third embodiment, the LEDs 32 are arranged at an equal interval on the elongated substrate 36a, and the substrate 36a is positioned in a direction in which the plural LEDs 32 are arranged along the main scanning direction at the time of image reading. However, as shown in FIG. 5 (the second embodiment), the LEDs 32 may be arranged at both ends or one end in a longitudinal direction of the condensing body 33a.

Figure 9:
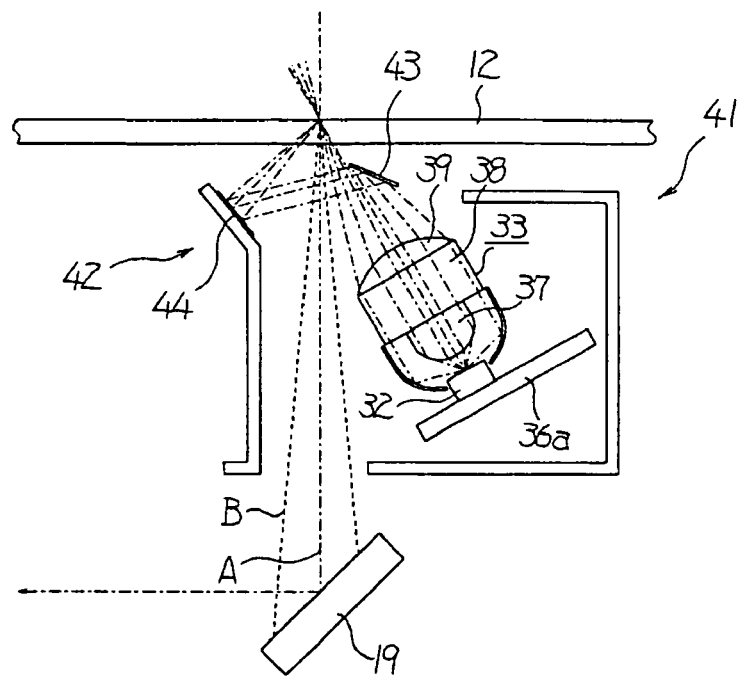
FIG. 9 is a front view of a lighting device according to a fourth embodiment of the present invention.

A fourth embodiment of the present invention will be explained with reference to FIG. 9. A lighting device 41 in this embodiment includes the LEDs 32 and the condensing body 33 explained in the first to the third embodiments and further includes a reflection mechanism 42 that reflects a part of rays, which are emitted from the condensing body 33, toward a surface of a document from an opposite side across the reading optical axis A.

The reflection mechanism 42 includes a first reflection plate 43 and a second reflection plate 44. The first reflection plate 43 reflects a part of rays, which are emitted from the condensing body 33, toward the second reflection plate 44. The second reflection plate 44 reflects the rays reflected by the first reflection plate 43 toward the surface of the document above the reading optical axis A on the contact glass 12.

Note that, as explained in the third embodiment, the condensing body 33 is arranged in an area close to the reading light reflection area B in which the rays reflected on the surface of the document travel along the reading optical axis A.

In such a structure, irradiation of rays on the surface of the document on the contact glass 12 can be performed from both sides in the sub-scanning direction at the time of image reading across the reading optical axis A by rays, which pass through the condensing body 33 and are directly irradiated on the surface of the document, and rays, which are reflected by the reflection mechanism 42 after passing through the condensing body 33. Consequently, the position of a peak value of a quantity of light of rays irradiated on the surface of the document can be brought closer to the reading optical axis A. Therefore, even when the surface of the document lifts from the contact glass 12, a rate of decline in a quantity of light irradiated on the surface of the document above the reading optical axis A decreases, and lighting performance of the lighting device 18 with respect to the surface of the document above the reading optical axis A and reading performance of the image reading apparatus 13 are maintained satisfactorily.

Moreover, since the surface of the document is lighted from both the sides across the reading optical axis A, even when a step of a cut and pasted document is present on the surface of the document, occurrence of a shadow in the step part is controlled.

A quantity of light irradiated on the surface of the document via the reflection mechanism 42 and a quantity of light directly irradiated on the surface of the document from the condensing body 33 can be adjusted by adjusting a size of the first reflection plate 43. The position of a peak value of a quantity of light of rays irradiated on the surface of the document can be brought closer to the reading optical axis A by this adjustment.

In the fourth embodiment, the LEDs 32 are arranged at an equal interval on the elongated substrate 36a, and the substrate 36a is positioned in a direction in which the plural LEDs 32 are arranged along the main scanning direction at the time of image reading. However, as shown in FIG. 5 (the second embodiment), the LEDs 32 may be arranged at both ends or one end in a longitudinal direction of the condensing body 33a.

Figure 10:
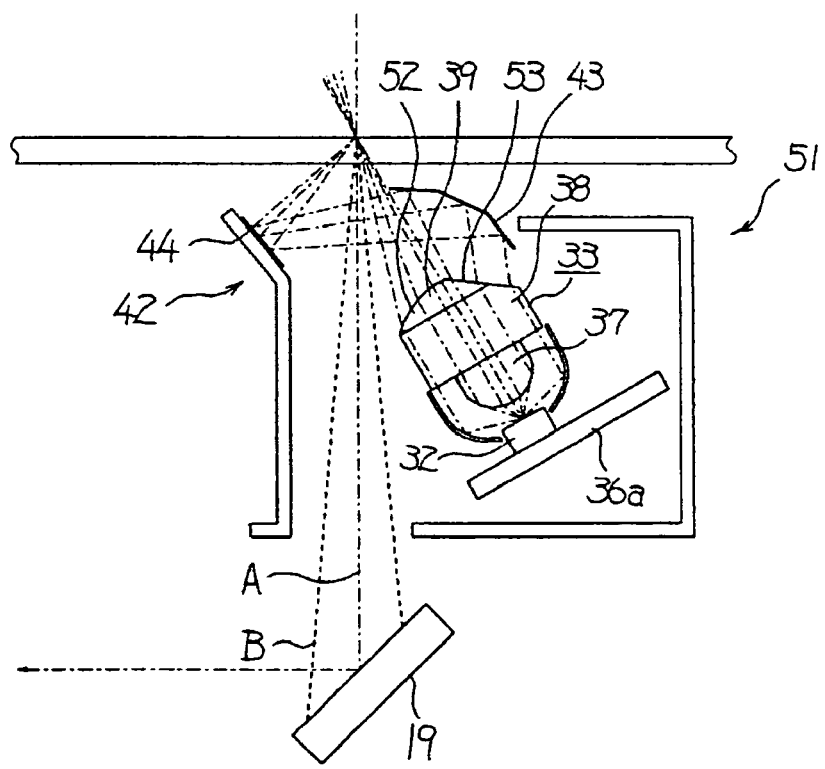
FIG. 10 is a front view of a lighting device according to a fifth embodiment of the present invention.

A fifth embodiment of the present invention will be explained with reference to FIG. 10. A lighting device 51 in the fifth embodiment has the same basic structure as that in the fourth embodiment, that is, the lighting device 51 includes the LEDs 32 and the condensing body 33 and further includes the reflection mechanism 42. This embodiment is different from the fourth embodiment in that a direct emitting portion 52 and an indirect emitting portion 53 having different curvatures are formed in an emission side part of the condensing body 33.

The direct emitting portion 52 is an unprocessed surface of the condensing lens 39. Rays emitted from this direct emitting portion 52 are irradiated toward an area above the reading optical axis A of the surface of the document on the contact glass 12.

The indirect emitting portion 53 is formed by cutting a part of the condensing lens 39 and a part of the light guide member 38 and is also cut in a direction in which rays emitted from the indirect emitting portion 53 travel toward the first reflection plate 43.

Rays irradiated on the surface of the document on the contact glass 12 are divided into rays, which pass through the direct emitting portion 52 of the condensing body 33 and are directly irradiated, and rays, which are emitted from the indirect emitting portion 53 of the condensing body 33 and irradiated via the reflection mechanism 42. These two kinds of rays are irradiated toward the surface of the document above the reading optical axis A from both sides in the sub-scanning direction at the time of image reading across the reading optical axis A. Therefore, the position of a peak value of a quantity of light of rays irradiated on the surface of the document can be brought closer to the reading optical axis A.

Consequently, even when the surface of the document lifts from the contact glass 12, a rate of decline in a quantity of light irradiated on the surface of the document above the reading optical axis A decreases, and lighting performance with respect to the surface of the document above the reading optical axis A is maintained.

In the fifth embodiment, the LEDs 32 are arranged at an equal interval on the elongated substrate 36a, and the substrate 36a is positioned in a direction in which the plural LEDs 32 are arranged along the main scanning direction at the time of image reading. However, as shown in FIG. 5 (the second embodiment), the LEDs 32 may be arranged at both ends or one end in a longitudinal direction of the condensing body 33a.

Figure 11:
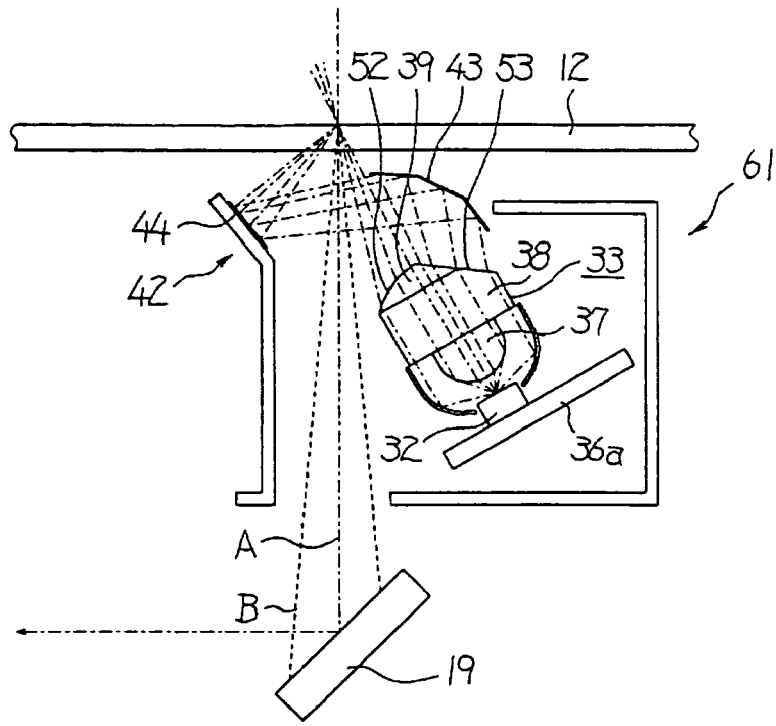
FIG. 11 is a front view of a lighting device according to a sixth embodiment of the present invention.

A sixth embodiment of the present invention will be explained with reference to FIG. 11. A basic structure of a lighting device 61 in the sixth embodiment is the same as that in the fifth embodiment. The sixth embodiment is different from the fifth embodiment in sizes of areas of the direct emitting portion 52 and the indirect emitting portion 53. The area of the indirect emitting portion 53 is formed larger than the area of the direct emitting portion 52.

When an optical path length of a ray, which is emitted from the direct emitting portion 52 and irradiated on the surface of the document, and an optical path length of a ray, which is emitted from the indirect emitting portion 53 and irradiated on the surface of the document via the reflection mechanism 42, are compared, the optical path length of the ray, which is emitted from the indirect emitting portion 53 and irradiated on the surface of the document, is longer and has a larger loss until the ray is irradiated on the surface of the document.

Thus, the area of the indirect emitting portion 53, is set larger than the area of the direct emitting portion 52. This makes it possible to adjust amounts of light irradiated on the surface of the document from both the sides of the reading optical axis A to be the same, and also makes it possible to bring the position of a peak value of a quantity of light of rays irradiated on the surface of the document and the position of the reading optical axis A close to each other. Even when the surface of the document lifts from the contact glass 12, a rate of decline in a quantity of light irradiated on the surface of the document above the reading optical axis A decreases, and lighting performance of the lighting device 18 with respect to the document surface above the reading optical axis A and reading performance of the image reading apparatus 13 are maintained satisfactorily.

Figure 12:
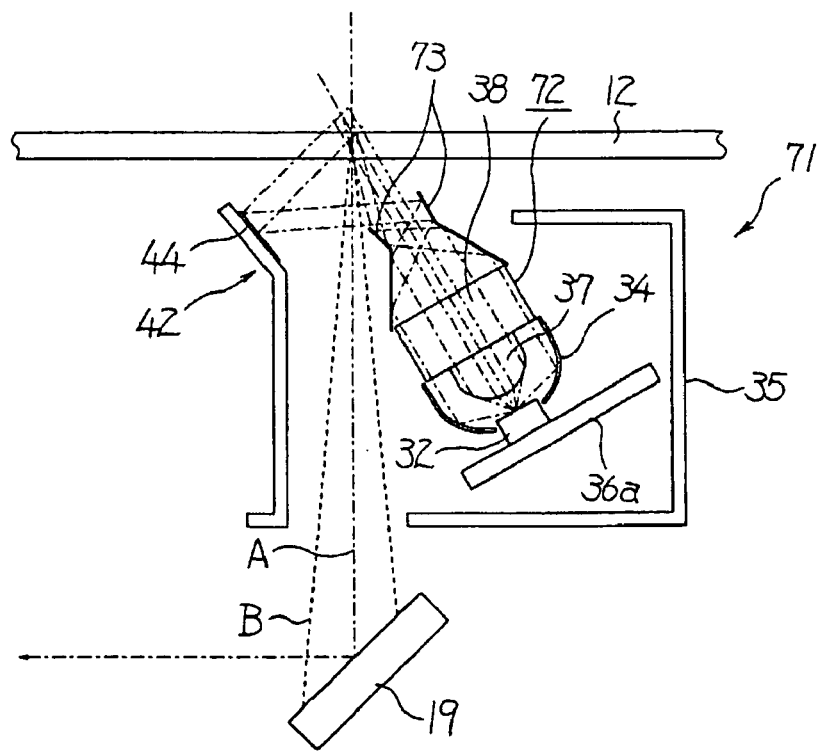
FIG. 12 is a front view of a lighting device according to a seventh embodiment of the present invention.

A seventh embodiment of the present invention will be explained with reference to FIG. 12. A lighting device 71 of the seventh embodiment includes the plural LEDs 32 serving as point light sources, a condensing body 72, the reflection plate 34, and the light-shielding member 35.

The condensing body 72 includes the lens 37 and the light guide member 38, which are molded integrally, and a reflection plate 73 attached to a light-emitting side of the light guide member 38.

The reflection plate 73 has a function of condensing rays, which have passed through the light guide member 38, toward the surface of the document on the contact glass 12 above the reading optical axis A and a function of reflecting a part of the rays, which have passed through the light guide member 38, to the second reflection plate 44. The reflection plate 73 and the second reflection plate 44 constitute the reflection mechanism 42 that reflects a part of the rays, which have emitted from the condensing body 72, from the opposite side across the reading optical axis A.

Irradiation of rays on the surface of the document on the contact glass 12 can be performed from both sides in the sub-scanning direction at the time of image reading across the reading optical axis A by rays, which pass through the condensing body 72 and are directly irradiated on the surface of the document, and rays, which are reflected by the reflection mechanism 42 after passing through the condensing body 72. Consequently, the position of a peak value of a quantity of light of rays irradiated on the surface of the document can be brought closer to the reading optical axis A. Therefore, even when the surface of the document lifts from the contact glass 12, a rate of decline in a quantity of light irradiated on the surface of the document above the reading optical axis A decreases, and lighting performance of the lighting device 18 with respect to the surface of the document above the reading optical axis A and reading performance of the image reading apparatus 13 (see FIG. 1) are maintained satisfactorily.

Figure 13:
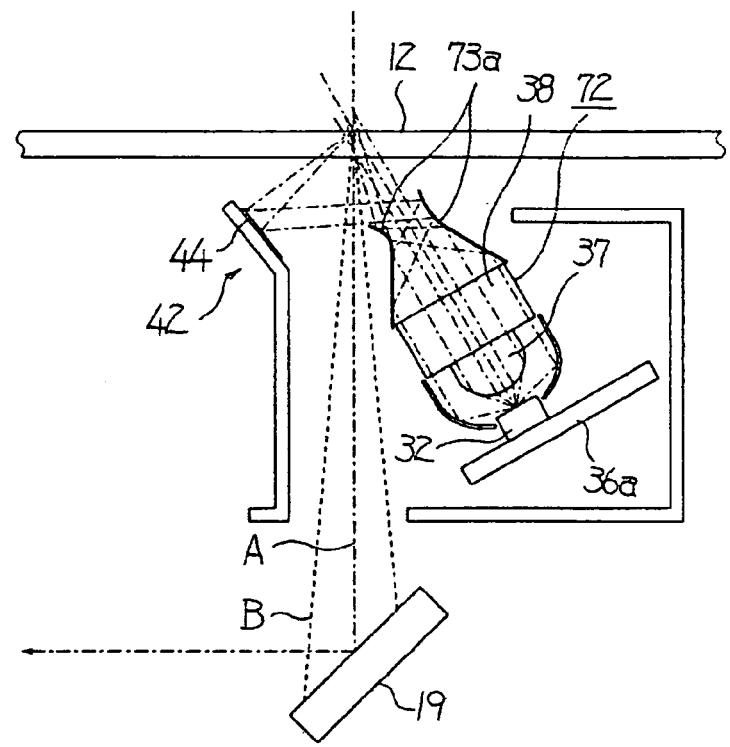
FIG. 13 is a front view of a modification of the lighting device.

In the seventh embodiment, the reflection plate 73 of a shape obtained by combining planes is explained as an example. However, a reflection plate 73a of a shape obtained by combining curved surfaces may be used as shown in FIG. 13.

Figure 14:
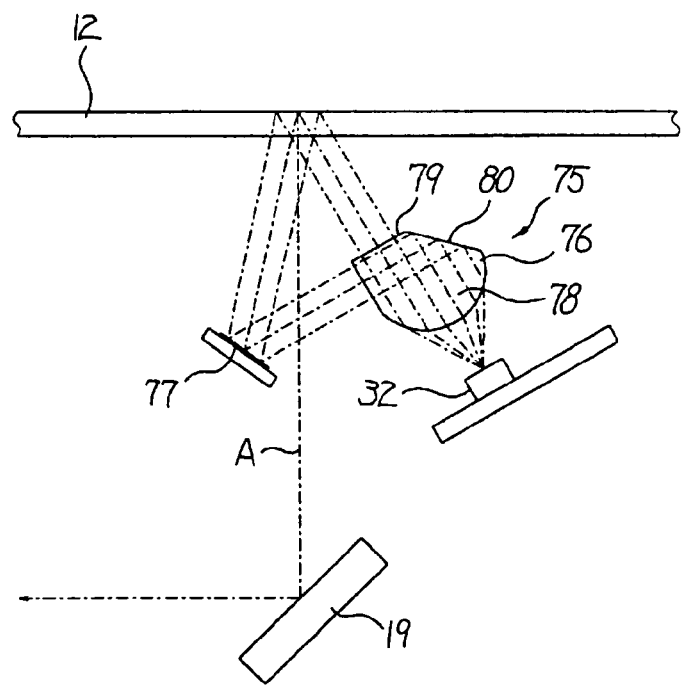
FIG. 14 is a front view of a lighting device according to an eighth embodiment of the present invention.
Figure 15:
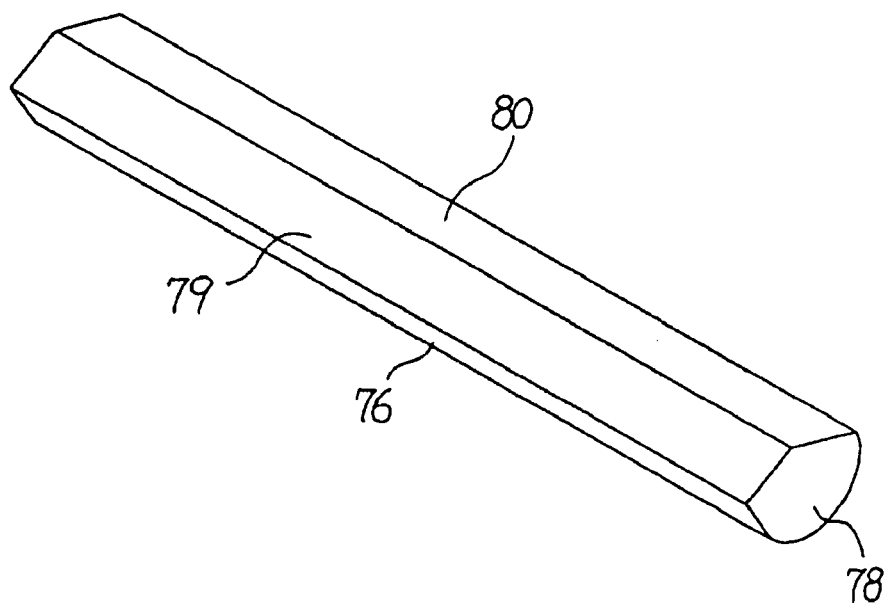
FIG. 15 is a perspective view of a condensing body.

An eighth embodiment of the present invention will be explained with reference to FIGS. 14 and 15. A lighting device 75 in the eighth embodiment includes the plural LEDs 32 serving as point light sources, a condensing body 76, and a reflection mechanism 77.

The condensing body 76 is arranged in front in an emitting direction of rays emitted from the LEDs 32 and condenses the rays emitted from the LEDs 32 within a reading width in the sub-scanning direction when reading a document (within a width appropriate for a reading line width in the sub-scanning direction). In addition, in this condensing body 76, an incident side protrusion 78, in which diffused rays emitted from the LEDs 32 are made incident to be converted into parallel rays, a direct emitting portion 79, which directly emits the incident rays to a surface of a document, and a prism reflection surface portion 80, which reflects the incident rays to the reflection mechanism 77, are formed.

The reflection mechanism 77 is a tabular reflection member arranged on the opposite side of the condensing body 76 across the reading optical axis A. The rays reflected by the prism reflection surface portion 80 are reflected by the reflection mechanism 77 again, and the reflected rays light the surface of the document from the opposite side of the reading optical axis A. Consequently, the surface of the document is lighted from both sides across the reading optical axis A by the rays emitted from the direct emitting portion 79 and the rays reflected by the reflection mechanism 77 again after being reflected by the prism reflection surface portion 80.

The condensing body 76 is arranged in a direction in which angles of all rays, which pass through this condensing body 76 to be irradiated, are smaller than a critical angle of total reflection on the contact glass 12.

The prism reflection surface portion 80 is formed by vapor-depositing aluminum on an outer peripheral surface of the condensing body 76 or subjecting the outer peripheral surface of the condensing body 76 to mirror polishing. A quantity of light to be reflected by this prism reflection surface portion 80 is set to be 50% to 90% of a total quantity of light that passes through the condensing body 76 to be irradiated. This setting is performed by adjusting reflection efficiency of the prism reflection surface portion 80 or adjusting an area of the prism reflection surface portion 80.

The rays emitted from the direct emitting portion 79 of the condensing body 76 directly light the surface of the document, and the rays reflected by the prism reflection surface portion 80 of the condensing body 76 light the surface of the document from the opposite side of the reading optical axis A after being reflected by the reflection mechanism 77 again. Consequently, the surface of the document is lighted from both the sides of the reading optical axis A, and even if a step of a cut and pastes document or the like is present on the surface of the document, occurrence of a shadow in the step part is controlled, and reading performance of the surface of the document is improved.

Figure 16:
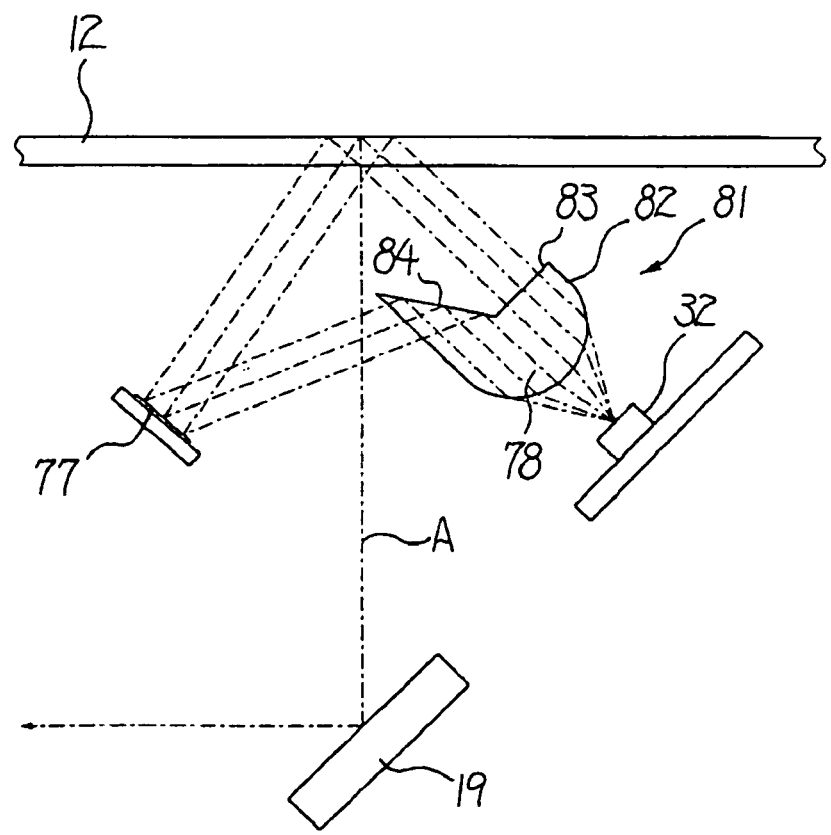
FIG. 16 is a front view of a lighting device according to a ninth embodiment of the present invention.
Figure 17:
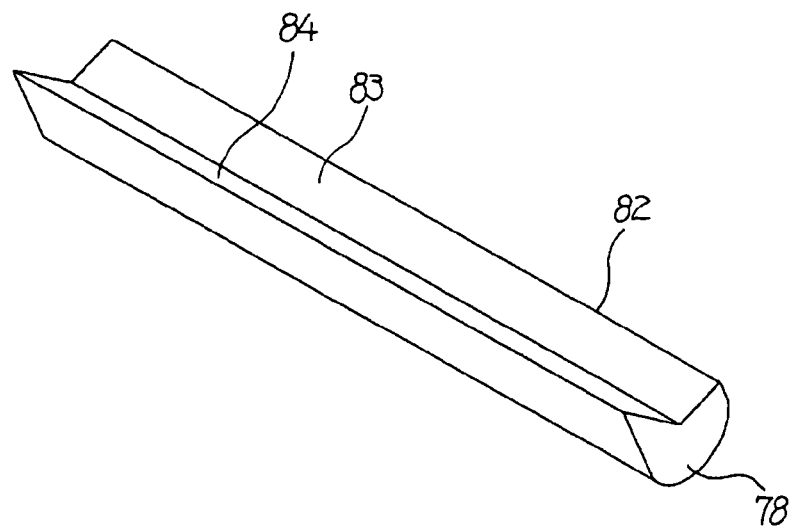
FIG. 17 is a perspective view of a condensing body.

A ninth embodiment of the present invention will be explained with reference o FIGS. 16 and 17. A lighting device 81 in the ninth embodiment includes the plural LEDs 32 serving as point light sources, a condensing body 82, and the reflection mechanism 77.

The condensing body 82 is arranged in front in an emitting direction of rays emitted from the LEDs 32 and condenses the rays emitted from the LEDs 32 within a reading width in the sub-scanning direction when reading a document (within a width appropriate for a reading line width in the sub-scanning direction). In addition, in this condensing body 82, the incident side protrusion 78, in which diffused rays emitted from the LEDs 32 are made incident to be converted into parallel rays, a direct emitting portion 83, which directly emits the incident rays toward a surface of a document, and a prism reflection surface portion 84, which reflects the incident rays toward the reflection mechanism 77, are formed.

The reflection mechanism 77 is a tabular reflection member arranged on the opposite side of the condensing body 82 across the reading optical axis A. The rays reflected by the prism reflection surface portion 84 are reflected by the reflection mechanism 77 again, and the reflected rays light the surface of the document from the opposite side of the reading optical axis A. Consequently, the surface of the document is lighted from both sides across the reading optical axis A by the rays emitted from the direct emitting portion 83 and the rays reflected by the reflection mechanism 77 again after being reflected by the prism reflection surface portion 84.

The condensing body 82 is arranged in a direction in which angles of all rays, which pass through this condensing body 82 to be irradiated, are smaller than a critical angle of total reflection on the contact glass 12.

The prism reflection surface portion 84 is formed by vapor-depositing aluminum on an outer peripheral surface of the condensing body 82 or subjecting the outer peripheral surface of the condensing body 82 to mirror polishing. A quantity of light to be reflected by this prism reflection surface portion 84 is set to be 50 to 90% of a total quantity of light that passes through the condensing body 82 to be irradiated. This setting is performed by adjusting reflection efficiency of the prism reflection surface portion 84 or adjusting an area of the prism reflection surface portion 84.

In addition, in this condensing body 82, a distance from the LEDs 32 to the direct emitting portion 83 is formed shorter than a distance from the LEDs 32 to the prism reflection surface portion 84.

The rays emitted from the direct emitting portion 83 of the condensing body 82 directly light the surface of the document, and the rays reflected by the prism reflection surface portion 84 of the condensing body 82 light the surface of the document from the opposite side of the reading optical axis A after being reflected by the reflection mechanism 77 again. Consequently, the surface of the document is lighted from both the sides of the reading optical axis A, and even if a step of a cut and pasted document or the like is present on the surface of the document, occurrence of a shadow in the step part is controlled, and reading performance of the surface of the document is improved.

In addition, since the distance from the LEDs 32 to the direct emitting portion 83 is formed shorter than the distance from the LEDs 32 to the prism reflection surface portion 84, when the rays reflected by the prism reflection surface portion 84 travel toward the reflection mechanism 77, a distance that the rays pass through the condensing body 82 is reduced, and a loss in a quantity of light reflected by the prism reflection surface portion 84 is reduced.

Figure 18:
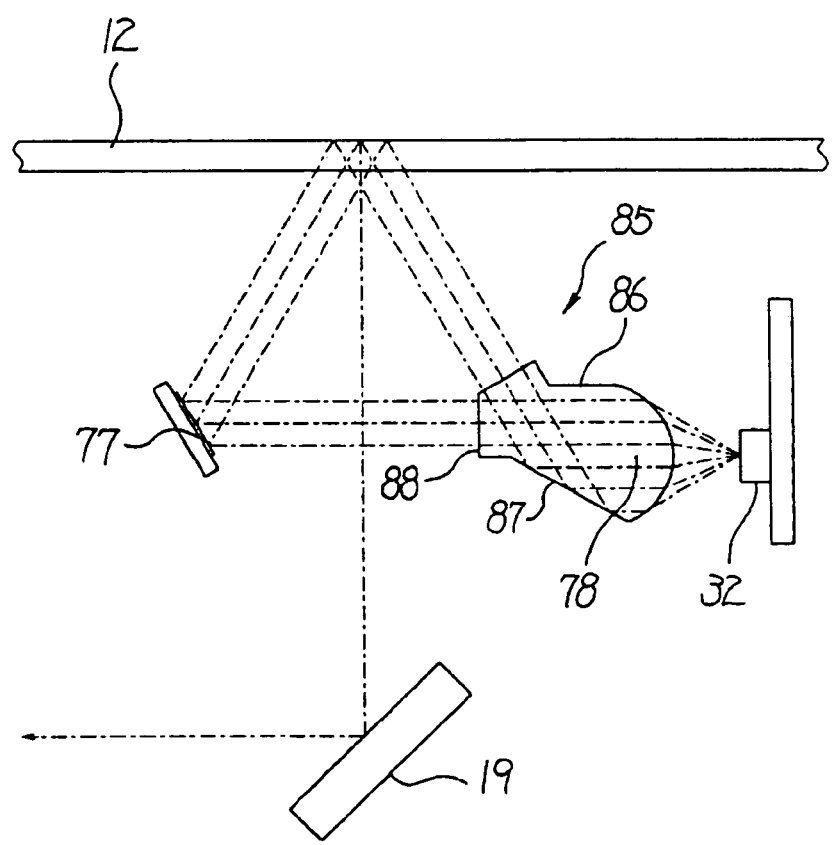
FIG. 18 is a front view of a lighting device according to a tenth embodiment of the present invention.

A tenth embodiment of the present invention will be explained with reference to FIG. 18. A lighting device 85 of the tenth embodiment includes the plural LEDs 32 serving as point light sources, a condensing body 86, and the reflection mechanism 77.

The condensing body 86 is arranged in front in an emitting direction of rays emitted from the LEDs 32 and condenses the rays emitted from the LEDs 32 within a reading width in the sub-scanning direction when reading a document (within a width appropriate for a reading line width in the sub-scanning direction). In addition, in this condensing body 86, the incident side protrusion 78, in which diffused rays emitted from the LEDs 32 are made incident to be converted into parallel rays, a prism reflection surface portion 87, which reflects the incident rays toward a surface of a document, and an indirect emitting portion 88, which causes the incident rays travel toward the reflection mechanism 77, are formed.

The reflection mechanism 77 is a tabular reflection member arranged on the opposite side of the condensing body 86 across the reading optical axis A. The rays emitted from the indirect emitting portion 88 are reflected by the reflection mechanism 77, and the reflected rays light the surface of the document from the opposite side of the reading optical axis A. Consequently, the surface of the document is lighted from both sides across the reading optical axis A by the rays reflected by the prism reflection surface portion 87 and the rays reflected by the reflection mechanism 77 after being emitted from the indirect emitting portion 88.

The condensing body 86 is arranged in a direction in which angles of all rays, which pass through this condensing body 86 to be irradiated, are smaller than a critical angle of total reflection on the contact glass 12.

The prism reflection surface portion 87 is formed by vapor-depositing aluminum on an outer peripheral surface of the condensing body 86 or subjecting the outer peripheral surface of the condensing body 86 to mirror polishing. A quantity of light to be reflected by this prism reflection surface portion 87 is set to be 50 to 90% of a total quantity of light that passes through the condensing body 86 to be irradiated. This setting is performed by adjusting reflection efficiency of the prism reflection surface portion 87 or adjusting an area of the prism reflection surface portion 87.

In such a structure, the rays reflected by the prism reflection surface portion 87 of the condensing body 86 directly light the surface of the document, and the rays emitted from the indirect emitting portion 88 of the condensing body 86 light the surface of the document from the opposite side of the reading optical axis A after being reflected by the reflection mechanism 77. Consequently, the surface of the document is lighted from both the sides of the reading optical axis A, and even if a step of a cut and pasted document or the like is present on the surface of the document, occurrence of a shadow in the step part is controlled, and reading performance of the surface of the document is improved.

Figure 19:
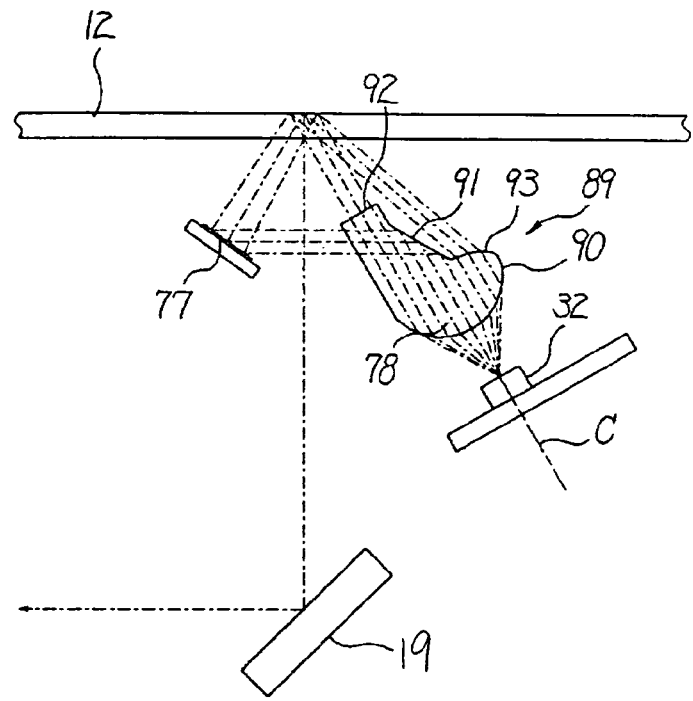
FIG. 19 is a front view of a lighting device according to an eleventh embodiment of the present invention.

An eleventh embodiment of the present invention will be explained with reference to FIG. 19. A lighting device 89 of this embodiment includes the plural LEDs 32 serving as point light sources, a condensing body 90, and the reflection mechanism 77.

The condensing body 90 is arranged in front in an emitting direction of rays emitted from the LEDs 32 and condenses the rays emitted from the LEDs 32 within a reading width in the sub-scanning direction when reading a document (within a width appropriate for a reading line width in the sub-scanning direction). In addition, in this condensing body 90, the incident side protrusion 78, in which diffused rays emitted from the LEDs 32 are made incident to be converted into parallel rays, a prism reflection surface portion 91, which reflects the incident rays toward the reflection mechanism 77, a direct emitting portion 92, which directly emits rays toward a surface of a document, and a refracting and emitting portion 93, which refracts and emits rays toward the surface of the document, are formed.

The prism reflection surface portion 91 is formed in a central part of the condensing body 90 and a position opposed to an optical axis center C of the LED 32, and the direct emitting portion 92 and the refracting and emitting portion 93 are formed on both sides across the prism reflection surface portion 91.

The reflection mechanism 77 is a tabular reflection member arranged on the opposite side of the condensing body 90 across the reading optical axis A. The rays reflected by the prism reflection surface portion 91 are reflected by the reflection mechanism 77 again, and the reflected rays light the surface of the document from the opposite side of the reading optical axis A. Consequently, the surface of the document is lighted from both sides across the reading optical axis A by the rays emitted from the direct emitting portion 92 and the refracting and emitting portion 93 and the rays reflected by the reflection mechanism 77 again after being reflected by the prism reflection surface portion 91.

The condensing body 90 is arranged in a direction in which angles of all rays, which pass through this condensing body 90 to be irradiated, are smaller than a critical angle of total reflection on the contact glass 12.

The prism reflection surface portion 91 is formed by vapor-depositing aluminum on an outer peripheral surface of the condensing body 90 or subjecting the outer peripheral surface of the condensing body 90 to mirror polishing. A quantity of light to be reflected by this prism reflection surface portion 87 is set to be 20 to 70% of a total quantity of light that passes through the condensing body 90 to be irradiated. This setting is performed by adjusting reflection efficiency of the prism reflection surface portion 91 or adjusting an area of the prism reflection surface portion 91.

In such a structure, the rays emitted from the direct emitting portion 92 and the refracting and emitting portion 93 of the condensing body 90 directly light the surface of the document, and the rays reflected by the prism reflection surface portion 91 light the surface of the document from the opposite side of the reading optical axis A after being reflected by the reflection mechanism 77 again. Consequently, the surface of the document is lighted from both the sides of the reading optical axis A, and even if a step of a cut and pasted document or the like is present on the surface of the document, occurrence of a shadow in the step part is controlled, and reading performance of the surface of the document is improved.

Since the LED 32 has a higher luminous flux density and a larger quantity of light in a position closer to the optical axis center C, the prism reflection surface portion 91 is provided in a position opposed to the optical axis center C of the LED 32 in the condensing body 90, and the rays reflected by the prism reflection surface portion 91 are reflected by the reflection mechanism 77 to light the surface of the document. This makes it possible to secure a quantity of light on a longer side of an optical path length that lights the surface of the document via the reflection mechanism 77 and makes it easy to adjust a balance of a quantity of light that lights the surface of the document from both the sides of the reading optical axis A.

Figure 20:
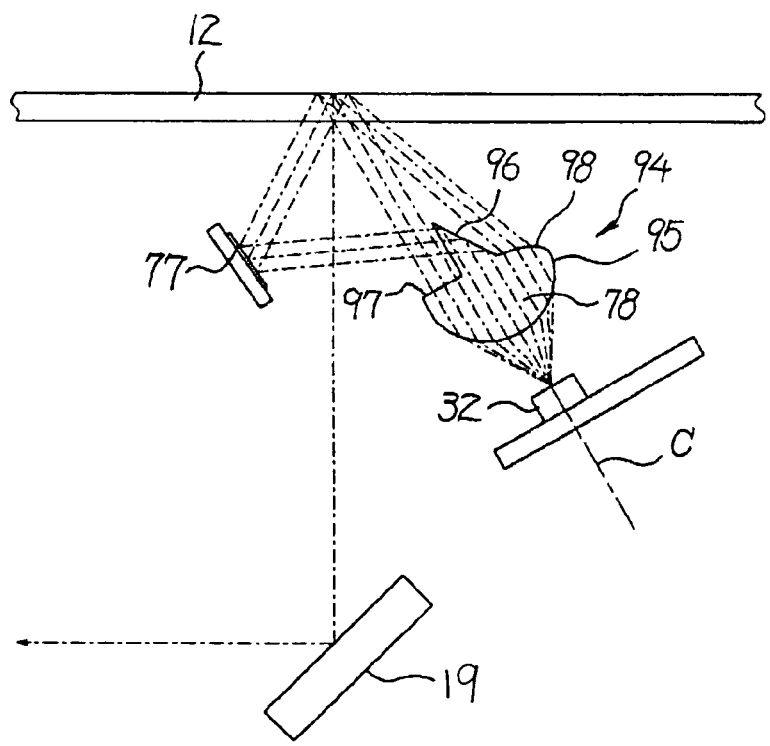
FIG. 20 is a front view of a lighting device according to a twelfth embodiment of the present invention

A twelfth embodiment of the present invention will be explained with reference to FIG. 20. A lighting device 94 in this embodiment includes the plural LEDs 32 serving as point light sources, a condensing body 95, and the reflection mechanism 77.

The condensing body 95 is arranged in front in an emitting direction of rays emitted from the LEDs 32 and condenses the rays emitted from the LEDs 32 within a reading width in the sub-scanning direction when reading a document (within a width appropriate for a reading line width in the sub-scanning direction). In addition, in this condensing body 95, the incident side protrusion 78, in which diffused rays emitted from the LEDs 32 are made incident to be converted into parallel rays, a prism reflection surface portion 96, which reflects the incident rays toward the reflection mechanism 77, a direct emitting portion 97, which directly emits rays toward a surface of a document, and a refracting and emitting portion 98, which refracts and emits rays toward the surface of the document, are formed.

The prism reflection surface portion 96 is formed in a central part of the condensing body 95 and a position opposed to an optical axis center C of the LED 32, and the direct emitting portion 97 and the refracting and emitting portion 98 are formed on both sides across the prism reflection surface portion 96.

The reflection mechanism 77 is a tabular reflection member arranged on the opposite side of the condensing body 95 across the reading optical axis A. The rays reflected by the prism reflection surface portion 96 are reflected by the reflection mechanism 77 again, and the reflected rays light the surface of the document from the opposite side of the reading optical axis A. Consequently, the surface of the document is lighted from both sides across the reading optical axis A by the rays emitted from the direct emitting portion 97 and the refracting and emitting portion 93 and the rays reflected by the reflection mechanism 77 again after being reflected by the prism reflection surface portion 96.

The condensing body 95 is arranged in a direction in which angles of all rays, which pass through this condensing body 95 to be irradiated, are smaller than a critical angle of total reflection on the contact glass 12.

The prism reflection surface portion 96 is formed by vapor-depositing aluminum on an outer peripheral surface of the condensing body 95 or subjecting the outer peripheral surface of the condensing body 95 to mirror polishing. A quantity of light to be reflected by this prism reflection surface portion 96 is set to be 20 to 70% of a total quantity of light that passes through the condensing body 95 to be irradiated. This setting is performed by adjusting reflection efficiency of the prism reflection surface portion 96 or adjusting an area of the prism reflection surface portion 96.

In addition, in this condensing body 95, a distance from the LEDs 32 to the direct emitting portion 97 and the refracting and emitting portion 98 is formed shorter than a distance from the LEDs 32 to the prism reflection surface portion 96.

In such a structure, the rays emitted from the direct emitting portion 97 and the refracting and emitting portion 98 of the condensing body 95 directly light the surface of the document, and the rays reflected by the prism reflection surface portion 96 light the surface of the document from the opposite side of the reading optical axis A after being reflected by the reflection mechanism 77 again. Consequently, the surface of the document is lighted from both the sides of the reading optical axis A, and even if a step of a cut and pasted document or the like is present on the surface of the document, occurrence of a shadow in the step part is controlled, and reading performance of the surface of the document is improved.

Since the LED 32 has a higher luminous flux density and a larger quantity of light in a position closer to the optical axis center C, the prism reflection surface portion 96 is provided in a position opposed to the optical axis center C of the LED 32 in the condensing body 95, and the rays reflected by the prism reflection surface portion 96 are reflected by the reflection mechanism 77 to light the surface of the document. This makes it possible to secure a quantity of light on a longer side of an optical path length that lights the surface of the document via the reflection mechanism 77 and makes it easy to adjust a balance of a quantity of light that lights the surface of the document from both the sides of the reading optical axis A.

In addition, since the distance from the LEDs 32 to the direct emitting portion 97 and the refracting and emitting portion 98 is formed shorter than the distance from the LEDs 32 to the prism reflection surface portion 96, a distance that the rays reflected by the prism reflection surface portion 96 pass through the condensing body 95 is reduced, and a loss in a quantity of light of rays reflected by the prism reflection surface portion 96 is reduced.

Next, a thirteenth embodiment of the present invention will be explained with reference to FIGS. 21, 22, and 23.

Figure 21:
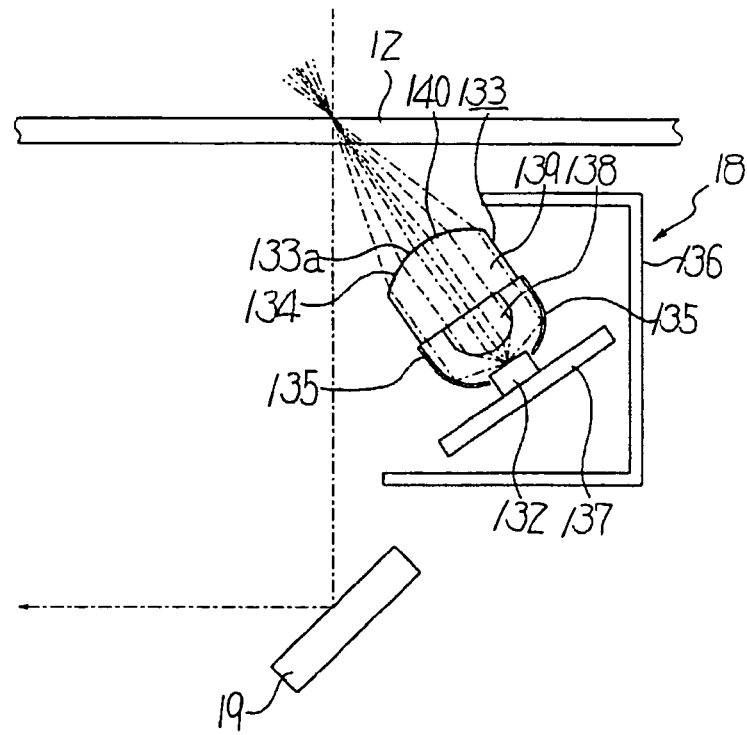
FIG. 21 is a front view of a lighting device and a first mirror that are mounted on a first traveling body.

FIG. 21 is a front view showing the lighting device 18 and the first mirror 19 mounted on the first traveling body 14.

Figure 22:
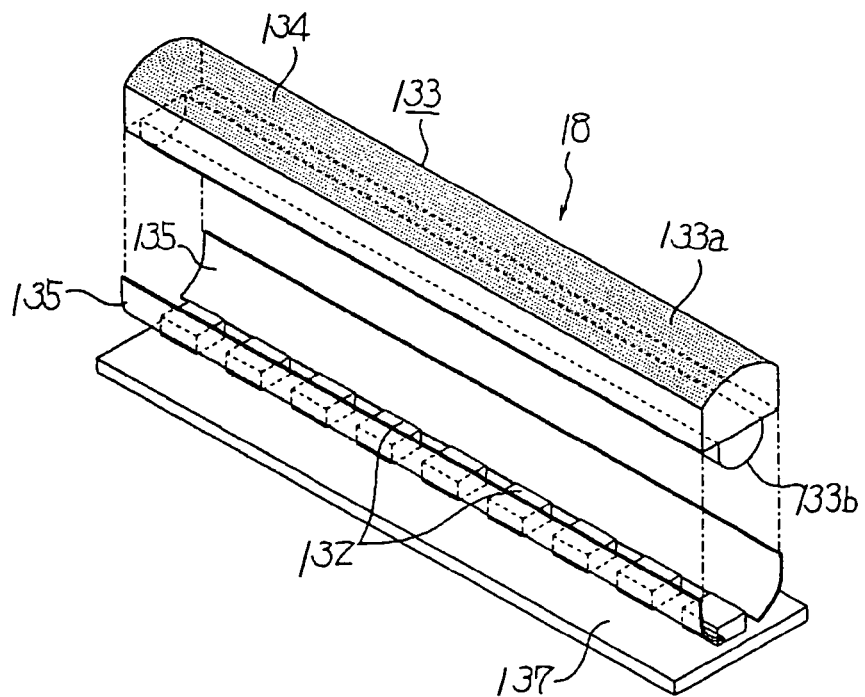
FIG. 22 is a disassembled perspective view showing the lighting device.

FIG. 22 is a perspective view showing the lighting device 18 in a disassembled form. The lighting device 18 includes plural LEDs 132 serving as point light sources, a condensing body 133, a reflection plate 135, and a light-shielding member 136.

The LEDs 132 are arranged linearly at an equal interval on an elongated substrate 36. A substrate 137 is positioned in a direction in which the plural LEDs 32 are arranged along a main scanning direction at the time of image reading.

The condensing body 133 includes a lens 138, a light guide member 139, and a condensing lens 140, which are integrally molded, and is formed in an elongated shape having substantially the same length as the substrate 137. The condensing body 133 is positioned with a direction of the elongated shape aligned with the main scanning direction at the time of image reading. Rays emitted from the LEDs 132 are transmitted through the condensing body 133 and condensed in a direction perpendicular to the arrangement direction of the LEDs 132 (a sub-scanning direction at the time of image reading).

A light diffusing portion 134 is formed over the entire surface of an exit surface (a surface opposed to the contact glass 12 in the condensing body 133) 133a through which rays emitted from the LEDs 132 exit from the condensing body 133 when the rays are transmitted through the condensing body 133. In other words, the light diffusing portion 134 is arranged on an optical path through which the rays emitted from the LEDs 132 reaches a surface of a document that is an object of lighting. This light diffusing portion 134 has an action of diffusing rays, which are transmitted through and exit from the exit surface 133a, at random.

The light diffusing portion 134 is formed by surface roughing treatment such as sand blast or etching with a light diffusing degree of 80±10% and a light transmittance 90% or more.

The light diffusing portion 134 may be formed by a method other than the surface roughing treatment, for example, matt coating treatment for applying a flatting agent containing amorphous silicon dioxide or other particulates, embossing treatment for embossing the inside of a mold that forms the condensing body 133, or the like. In addition, concerning a position where the light diffusing member 134 is formed, the light diffusing member 134 may be formed over the entire surface of an incident surface (a surface opposed to the LEDs 132 in the condensing body 133) 133b through which rays emitted from the LEDs 132 are made incident in the condensing body 133 when the rays are transmitted through the condensing body 133.

The reflection plate 135 is formed in a paraboloid shape having substantially the same length as the substrate 137 and the condensing body 133 and having a recessed surface on a side opposed to the condensing body 133. The reflection plate 135 is arranged with the recessed surface opposed to a side in a longitudinal direction of the condensing body 133.

Figure 23:
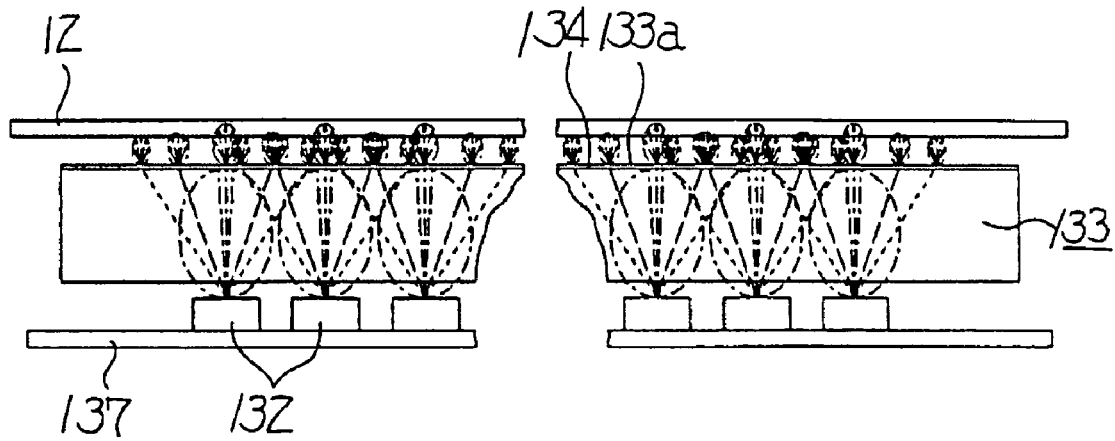
FIG. 23 is a side view explaining a state in which rays emitted from LEDs and transmitted through a condensing body are diffused at random in a light diffusing portion.

FIG. 23 is a side view explaining a state in which rays emitted from the LEDs 132 and transmitted through the condensing body 133 are diffused at random in the light diffusing portion 134. The rays emitted from the LEDs 132 are condensed by the condensing body 133 in a direction perpendicular to the arrangement direction of the LEDs 132 and are diffused at random by the light diffusing portion 134 when the rays are emitted from the condensing body 133.

In such a structure, the rays emitted from the LEDs 132 are transmitted through the condensing body 133 and, then, irradiated on a surface of a document placed on the contact glass 12 or a surface of a document conveyed by the ADF 11.

When the rays emitted from the LED 132 are transmitted through the condensing body 133, the rays are diffused by the light diffusing portion 134 that is formed in the exit surface 133a of the condensing body 133. Therefore, in a lighting position on the surface of the document, occurrence of an illuminance ripple, which is caused because the LEDs 132 are point light sources, is prevented. A uniform illuminance is obtained over the entire area along the main scanning direction of image reading on the surface of the document.

Consequently, occurrence of illuminance unevenness on the surface of the document is prevented, occurrence of concentration unevenness of image data due to illuminance unevenness of rays lighting the surface of the document is prevented, and occurrence of concentration unevenness of an image to be formed is prevented. As a result, light and shade of a stripe pattern due to the illuminance ripple does not occur, and a high-quality image is obtained.

Figure 24:
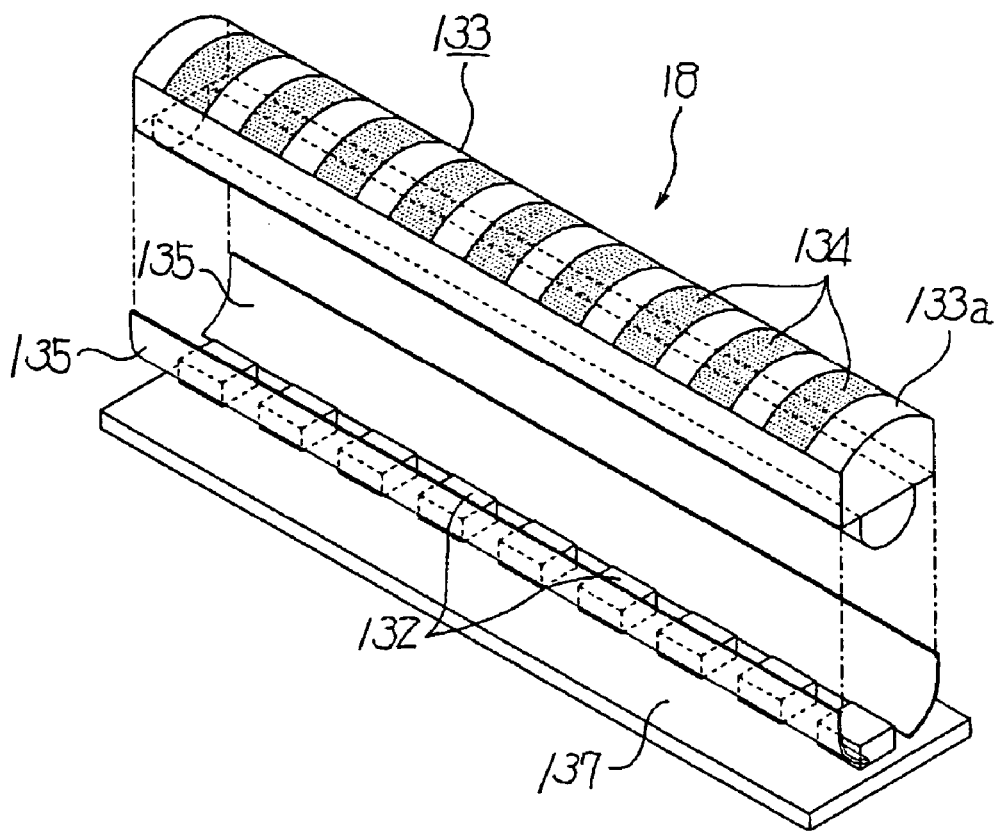
FIG. 24 is a disassembled perspective view of a lighting device according to a fourteenth embodiment of the present invention.
Figure 25:
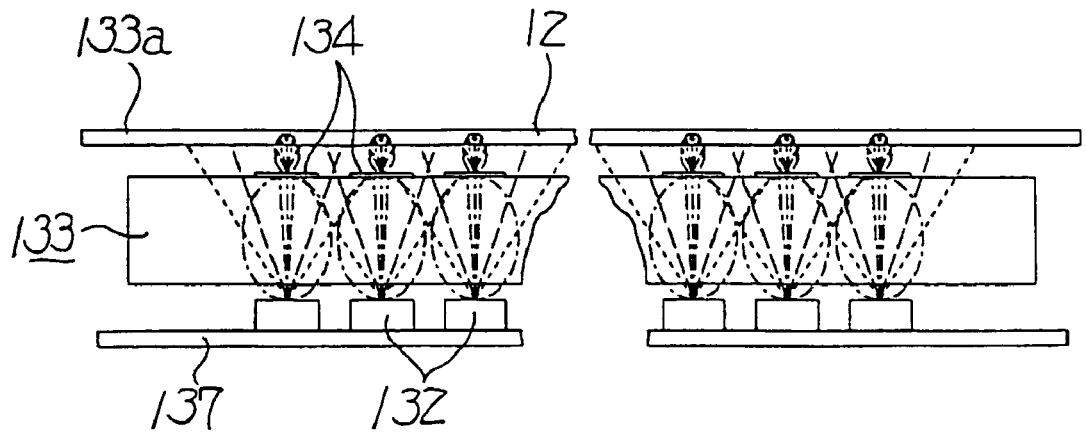
FIG. 25 is a side view explaining a state in which rays emitted from LEDs and transmitted through a condensing body are diffused at random in a light diffusing portion.

A fourteenth embodiment of the present invention will be explained with reference to FIGS. 24 and 25.

A basic structure in this embodiment is the same as that in the first embodiment. This embodiment is different from the first embodiment in that, whereas the light diffusing portion 134 is formed over the entire surface of the exit surface 133a in the condensing body 133 in the first embodiment, the light diffusing portion 134 is formed intermittently at an equal interval along the arrangement direction of the LEDs 132 in this embodiment. Positions where the light diffusing portion 134 is formed intermittently are set to be in a range including areas vertically opposed to the LEDs 132 when the LEDs 132 and the condensing body 133 are coupled to be positioned.

In such a structure, among the rays emitted from the LEDs 132, rays, which are likely to be a cause of occurrence of an illuminance ripple in the lighting position on the surface of the document, are rays emitted in a vertical direction or a direction nearly vertical. Rays emitted in an oblique direction from the LEDs 132 are less likely to be a cause of occurrence of an illuminance ripple in the lighting position on the surface of the document. Thus, the light diffusing portion 134 is formed intermittently on the exit surface 133a of the condensing body 133 to diffuse rays, which are emitted in the vertical direction or the direction nearly vertical from the LEDs 132, in the light diffusing portion 134, whereby occurrence of an illuminance ripple in the lighting position on the surface of the document is prevented.

Moreover, the rays emitted in the oblique direction from the LEDs 132, which are less likely to be a cause of an illuminance ripple in the lighting position on the surface of the document, are directly irradiated on the lighting position on the surface of the document without being diffused in the light diffusing portion 134, whereby an illuminance in the lighting position can be increased.

In this embodiment, the light diffusing portion 134 can also be formed by the surface roughing treatment, the matt coating treatment, the embossing treatment, or the like. In addition, the light diffusing portion 134 may be formed on the incident surface 133b of the condensing body 133.

Figure 26:
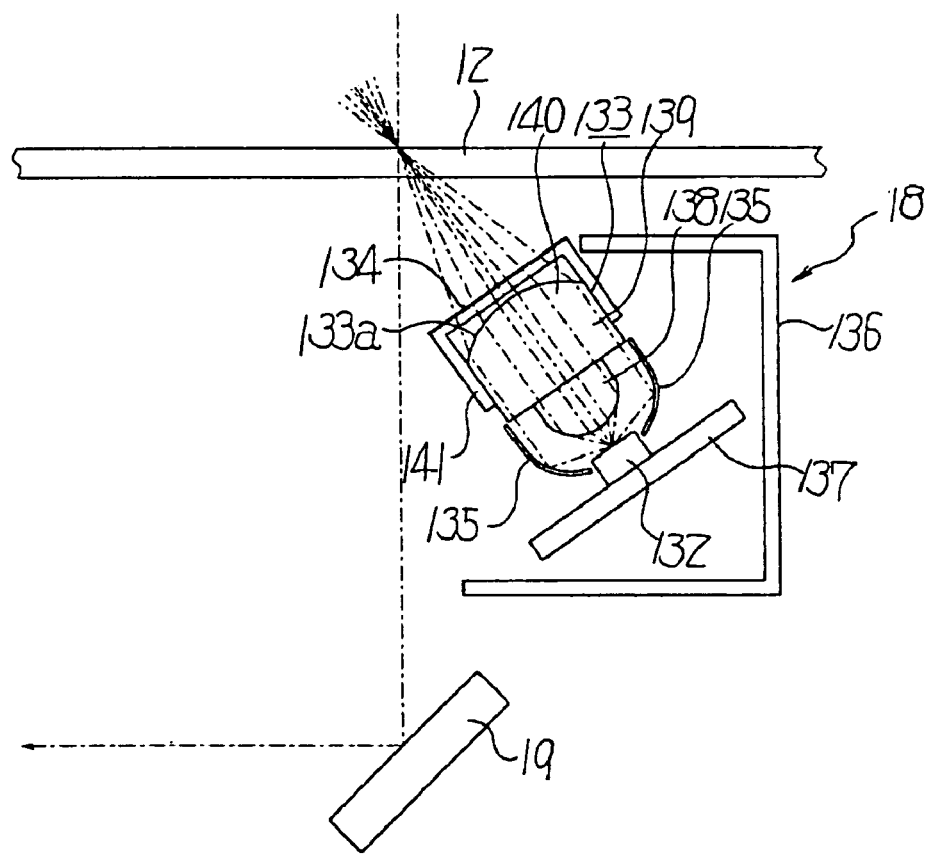
FIG. 26 is a front view of a lighting device and a first mirror that are mounted on a first traveling body in a fifteenth embodiment of the present invention.
Figure 27:
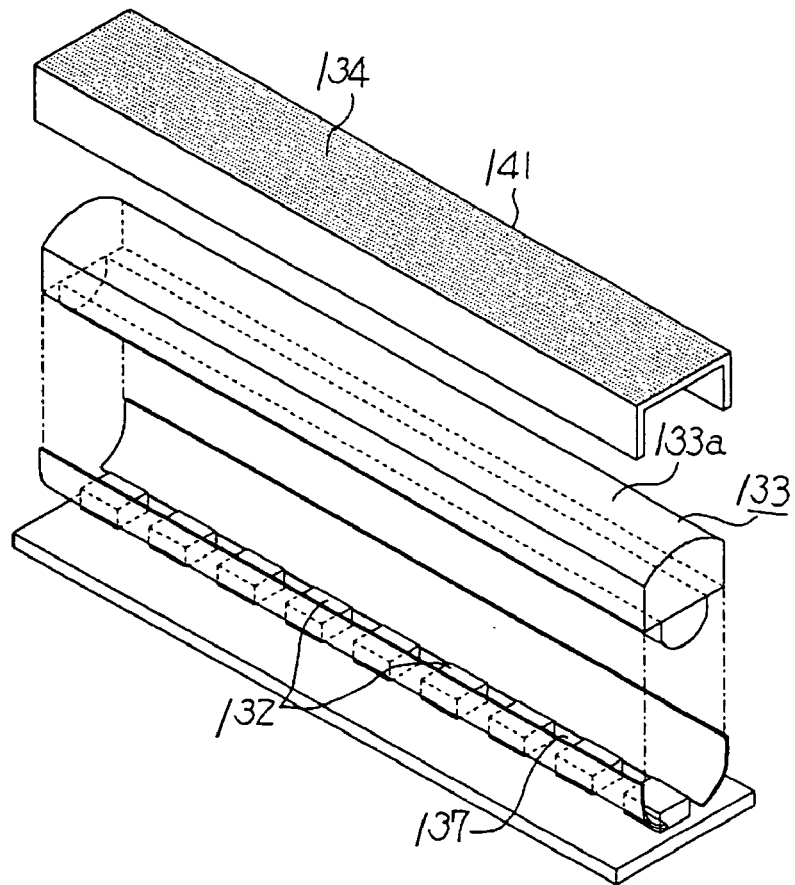
FIG. 27 is a disassembled perspective view of a lighting device.
Figure 28:
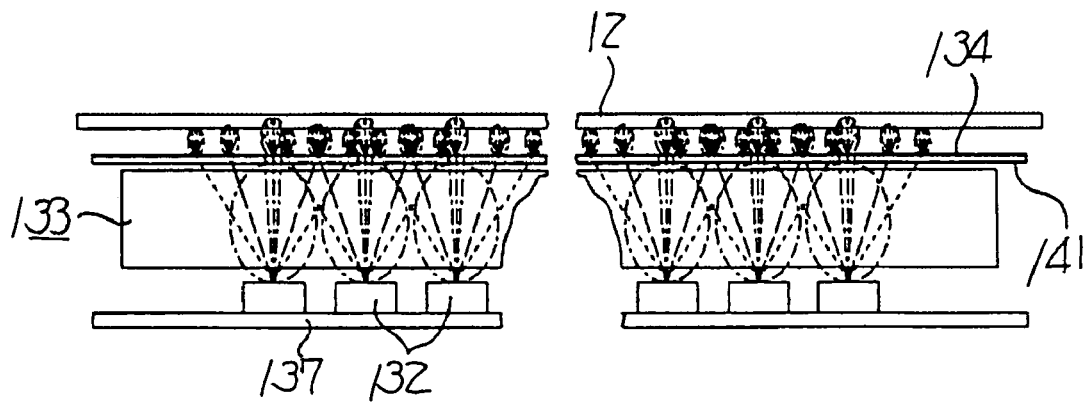
FIG. 28 is a side view explaining a state in which rays emitted from LEDs and transmitted through a condensing body are diffused at random in a light diffusing portion.

A fifteenth embodiment of the present invention will be explained with reference to FIGS. 26 to 28. A basic structure in this embodiment is the same as that in the first embodiment. This embodiment is different from the first embodiment in that, whereas the light diffusing portion 134 is formed on the exit surface 133a of the condensing body 133 in the first embodiment, a light diffusing member 141 is provided in a body separate from the condensing body 133 and the light diffusing portion 134 is formed in this light diffusing member 141 in this embodiment. In other words, in this embodiment, the light diffusing portion 134 is also arranged on the optical path through which the rays emitted from the LEDs 132 reach the surface of the document, which is an object of lighting. In addition, the light diffusing portion 134 is formed over the entire surface opposed to the exit surface 133a of the condensing body 133 in the light diffusing member 141.

The light diffusing portion 134 in this embodiment is formed by the surface roughing treatment, the matt coating treatment, the embossing treatment, or the like in the same manner as the light diffusing portion 134 on the first embodiment.

In such a structure, the light diffusing portion 134 is also provided on the optical path through which the rays emitted from the LEDs 132 reach the surface of the document in this embodiment. Thus, since the rays emitted from the LEDs 132 are irradiated on the surface of the document after being diffused in a random direction by the light diffusing portion 134, occurrence of an illuminance ripple, which is caused because the LEDs 132 are point light sources, is prevented. A uniform illuminance is obtained over the entire area along the main scanning direction of image reading on the surface of the document.

Consequently, occurrence of illuminance unevenness on the surface of the document is prevented, occurrence of concentration unevenness of image data due to illuminance unevenness of rays lighting the surface of the document is prevented, and occurrence of concentration unevenness of an image to be formed is prevented. As a result, light and shade of a stripe pattern due to the illuminance ripple does not occur, and a high quality image is obtained.

In addition, in this embodiment, since the light diffusing portion 134 is formed in the light diffusing member 141, which is provided in the body separate from the condensing body 133, a degree of freedom of selection of a material for the light diffusing member 141 is increased, and the light diffusing member 141 can be formed by selecting a material optimum for forming the light diffusing portion 134. This makes it possible to form the light diffusing portion 134 that has high performance in terms of a light diffusing degree and a light transmittance.

Further, improvement of a quality of an image to be formed on the recording media S can be attained by improving the performance of the light diffusing portion 134.

Figure 29:
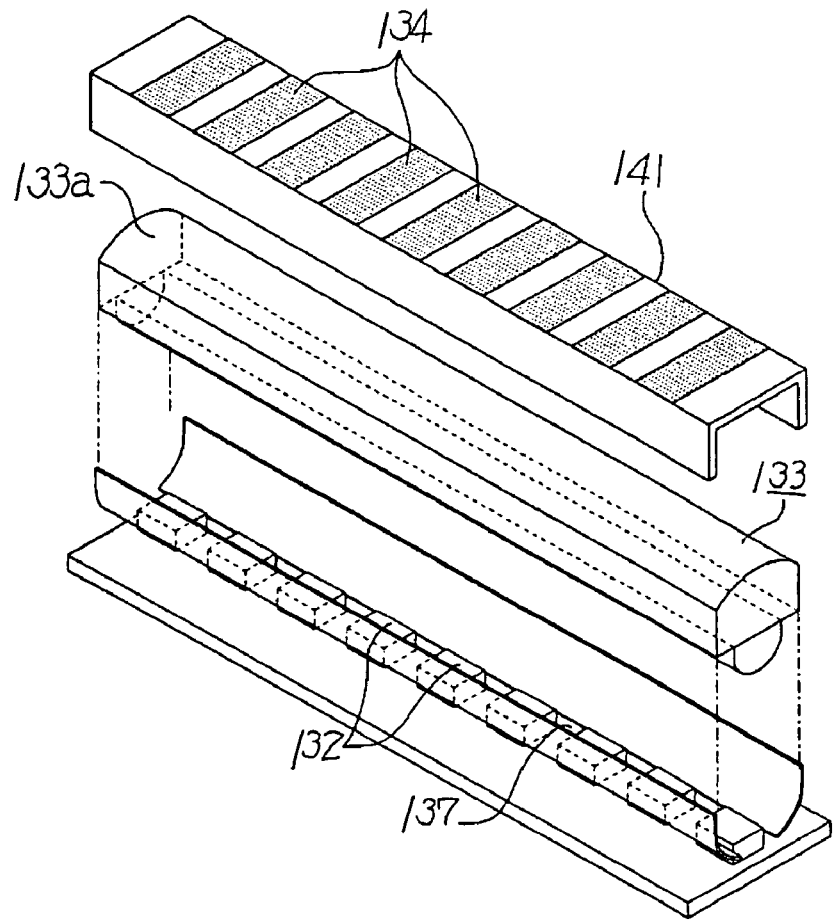
FIG. 29 is a disassembled perspective view of a lighting device according to a sixteenth embodiment of the present invention.
Figure 30:
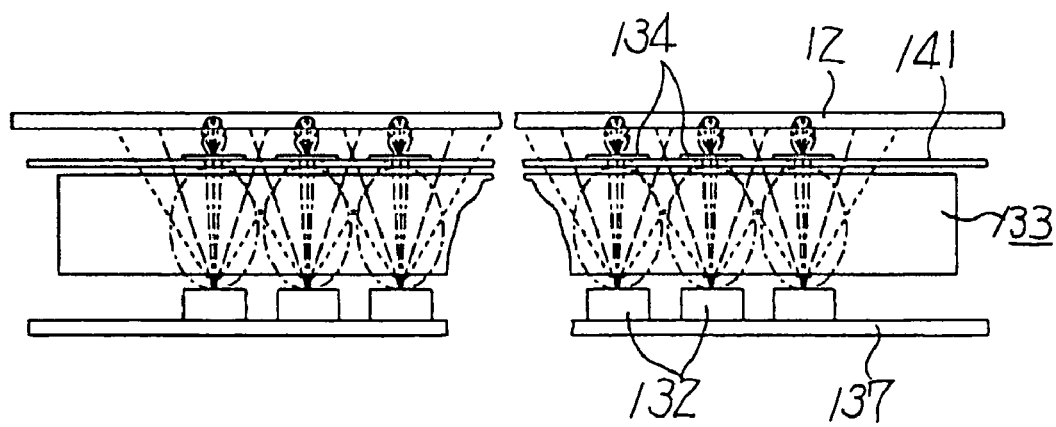
FIG. 30 is a side view explaining a state in which rays emitted from LEDs and transmitted through a condensing body are diffused at random in a light diffusing portion.

A sixteenth embodiment of the present invention will be explained with reference to FIGS. 29 and 30. A basic structure in this embodiment is the same as that that in the fifteenth embodiment. This embodiment is different from the fifteenth embodiment in that, whereas the light diffusing portion 134 is formed over the entire surface opposed to the exit surface 133a of the condensing body 133 in the light diffusing member 141 in the fifteenth embodiment, the light diffusing portion 134 is formed intermittently at an equal interval along an arrangement direction of the LEDs 132 on a surface opposed to the exit surface 133a of the condensing body 133 in the light diffusing member 141 in this embodiment. Positions where the light diffusing portion 134 is formed intermittently are set to be in a range including areas vertically opposed to the LEDs 132 when the light diffusing member 141 is coupled to the condensing body 133 and positioned.

The light diffusing portion 134 in this embodiment is formed by the surface roughing treatment, the matt coating treatment, the embossing treatment, or the like in the same manner as the light diffusing portion in the thirteenth to the fifteenth embodiments.

In such a structure, as explained in the fourteenth embodiment, among the rays emitted from the LEDs 132, rays, which are likely to be a cause of occurrence of an illuminance ripple in the lighting position on the surface of the document, are rays emitted in a vertical direction or a direction nearly vertical. Rays emitted in an oblique direction from the LEDs 132 are less likely to be a cause of occurrence of an illuminance ripple in the lighting position on the surface of the document. Thus, the light diffusing portion 134 to be formed in the light diffusing member 141 is formed intermittently along the arrangement direction of the LED 132 to diffuse rays, which are emitted in the vertical direction or the direction nearly vertical from the LEDs 132, in the light diffusing portion 134, whereby occurrence of an illuminance ripple in the lighting position on the surface of the document is prevented.

Moreover, the rays emitted in the oblique direction from the LEDs 132, which are less likely to be a cause of an illuminance ripple in the lighting position on the surface of the document, are directly irradiated on the lighting position on the surface of the document without being diffused in the light diffusing portion 134, whereby an illuminance in the lighting position can be increased.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A lighting device comprising:
    a point light configured to emit rays;
    a condensing body arranged in a direction of the rays emitted from the point light source and configured to condense the rays on a surface of a document, which is placed on a contact glass, within a reading width in a sub-scanning direction of the document, wherein the condensing body is arranged in an area close to a reading light reflection area in which the rays reflected on the surface of the document travel along a reading optical axis: and
    a reflection plate arranged between the point light source and the condensing body, wherein a width dimension of an inner surface of the reflection plate is set to be equal to or smaller than a width dimension of the condensing body.

2. An image reading apparatus, comprising:
    the lighting device according to claim 1; and
    a photoelectric conversion element that reads the rays reflected on the surface of the document after being emitted from the lighting device.

3. An image forming apparatus, comprising:
    an image reading apparatus including
        the lighting device according to claim 1, and
        a photoelectric conversion element that reads the rays reflected on the surface of the document after being emitted from the lighting device; and
    an image forming unit that forms an image on a recording medium according to image data read by the image reading apparatus.

4. A lighting device, comprising:
    a point light source that emits rays;
    a condensing body that is arranged in a direction of the rays emitted from the point light source and that condenses the rays on a surface of a document, which is placed on a contact glass, within a reading width in a sub-scanning direction of the document; and
    a reflection mechanism that reflects a first part of the rays, which pass through the condensing body, toward the surface of the document from an opposite side of a second part of the rays, which are not reflected by the reflection mechanism, with respect to a reading optical axis of light reflected from the surface of the document.

5. The lighting device according to claim 4, wherein the condensing body includes
    a direct emitting portion that directly emits the rays toward the surface of the document, and
    an indirect emitting portion that emits the rays toward the reflection mechanism, wherein the direct emitting portion and the indirect emitting portion have different curvatures.

6. The lighting device according to claim 5, wherein a surface area of the indirect emitting portion and a surface area of the direct emitting portion are such that a quantity of light of the rays, which are irradiated on the surface of the document via the reflection mechanism after being emitted from the indirect emitting portion, and a quantity of light of the rays, which are emitted from the direct emitting portion and irradiated on the surface of the document, are substantially the same.

7. The lighting device according to claim 5, wherein a surface area of the indirect emitting portion is larger than a surface area of the direct emitting portion.

8. An image reading apparatus, comprising:
the lighting device according to claim 4; and
a photoelectric conversion element that reads the rays reflected on the surface of the document after being emitted from the lighting device.

9. An image forming apparatus, comprising:
an image reading apparatus including
the lighting device according to claim 4, and
a photoelectric conversion element that reads the rays reflected on the surface of the document after being emitted from the lighting device; and
an image forming unit that forms an image on a recording medium according to image data read by the image reading apparatus.

10. A lighting device, comprising:
a plurality of point light sources arranged linearly;
a condensing body that is arranged in a direction of rays emitted from the point light sources and that condenses the rays in a direction perpendicular to an arrangement direction of the point light sources; and
a light diffusing portion that is arranged on an optical path through which the rays emitted from the point light sources reach an object to be lit and diffuses the rays at random,
wherein the light diffusing portion is formed on at least one of an incident surface or an exit surface with respect to the condensing body at a time when the rays emitted from the point light sources pass through the condensing body.

11. The lighting device according to claim 10, wherein the light diffusing portion is formed over an entire surface of at least one of the incident surface or the exit surface.

12. The lighting device according to claim 10, wherein the light diffusing portion is formed intermittently in a range including an area vertically opposed to the point light sources on at least one of the incident surface and the exit surface.

13. An image reading apparatus, comprising:
the lighting device according to claim 10 that lights a surface of a document; and
an image reading unit that reads reflected light from the surface of the document.

14. An image forming apparatus, comprising:
an image reading apparatus including
the lighting device according to claim 10 that lights a surface of a document; and
an image reading unit that reads reflected light from the surface of the document; and
an image forming unit that forms an image on a recording medium according to image data read by the image reading apparatus.

* * * * *